United States Patent [19]
Jeong et al.

[11] Patent Number: 5,687,580
[45] Date of Patent: Nov. 18, 1997

[54] REFRIGERATOR AND METHOD FOR CONTROLLING TEMPERATURE THEREOF BY CONTROLLING COOL AIR DISCHARGE DIRECTION

[75] Inventors: Seong-wook Jeong, Suwon; Jae-in Kim, Seoul; Yun-seog Kang, Suwon; Suk-hang Park, Suwon; Yong-myoung Kim, Suwon, all of Rep. of Korea

[73] Assignee: Samsung Electronics Co. Ltd., Suwon, Rep. of Korea

[21] Appl. No.: 564,652

[22] Filed: Nov. 29, 1995

[30] Foreign Application Priority Data

| Nov. 30, 1994 | [KR] | Rep. of Korea | 94-32116 |
| Dec. 10, 1994 | [KR] | Rep. of Korea | 94-33558 |
| Dec. 12, 1994 | [KR] | Rep. of Korea | 94-33751 |
| Oct. 25, 1995 | [KR] | Rep. of Korea | 95-37171 |

[51] Int. Cl.⁶ ................................. F25D 17/08
[52] U.S. Cl. ........................... 62/186; 64/408
[58] Field of Search .................. 62/179, 186, 187, 62/407, 408, 404, 413, 414, 415, 416, 177, 178, 89

[56] References Cited

U.S. PATENT DOCUMENTS

| 2,907,186 | 10/1959 | Barroero | 62/408 |
| 4,738,116 | 4/1988 | Himeno et al. | 62/186 |
| 5,214,936 | 6/1993 | Lim et al. | 62/407 |

*Primary Examiner*—Harry B. Tanner
*Attorney, Agent, or Firm*—Burns, Doane, Swecker & Mathis LLP

[57] ABSTRACT

A refrigerator having a cool air path and a cool air discharge control blade for distributing cool air and controlling the discharge direction thereof and a method for controlling refrigerator temperature by controlling a cool air discharge direction are provided. By placing a disk-shaped cool air guiding portion in a discharge hole, cool air is rapidly and uniformly distributed via the cool air path and by low-speed rotation of the cool air discharge control blade, thus keeping the refrigerator at a predetermined temperature uniformly. Temperature sensors are installed on each side of the refrigeration compartment and the sensed average or representative temperatures are compared with a control reference temperature, so that cool air can be discharged to high temperature areas.

49 Claims, 18 Drawing Sheets

United States Patent [19]

Jeong et al.

[11] Patent Number: 5,687,580
[45] Date of Patent: Nov. 18, 1997

[54] REFRIGERATOR AND METHOD FOR CONTROLLING TEMPERATURE THEREOF BY CONTROLLING COOL AIR DISCHARGE DIRECTION

[75] Inventors: Seong-wook Jeong, Suwon; Jae-in Kim, Seoul; Yun-seog Kang, Suwon; Suk-hang Park, Suwon; Yong-myoung Kim, Suwon, all of Rep. of Korea

[73] Assignee: Samsung Electronics Co. Ltd., Suwon, Rep. of Korea

[21] Appl. No.: 564,652

[22] Filed: Nov. 29, 1995

[30] Foreign Application Priority Data

| Nov. 30, 1994 | [KR] | Rep. of Korea | 94-32116 |
| Dec. 10, 1994 | [KR] | Rep. of Korea | 94-33558 |
| Dec. 12, 1994 | [KR] | Rep. of Korea | 94-33751 |
| Oct. 25, 1995 | [KR] | Rep. of Korea | 95-37171 |

[51] Int. Cl.⁶ .................................................. F25D 17/08
[52] U.S. Cl. ........................................ 62/186; 64/408
[58] Field of Search .................. 62/179, 186, 187, 62/407, 408, 404, 413, 414, 415, 416, 177, 178, 89

[56] References Cited

U.S. PATENT DOCUMENTS

| 2,907,186 | 10/1959 | Barroero | 62/408 |
| 4,738,116 | 4/1988 | Himeno et al. | 62/186 |
| 5,214,936 | 6/1993 | Lim et al. | 62/407 |

*Primary Examiner*—Harry B. Tanner
*Attorney, Agent, or Firm*—Burns, Doane, Swecker & Mathis LLP

[57] ABSTRACT

A refrigerator having a cool air path and a cool air discharge control blade for distributing cool air and controlling the discharge direction thereof and a method for controlling refrigerator temperature by controlling a cool air discharge direction are provided. By placing a disk-shaped cool air guiding portion in a discharge hole, cool air is rapidly and uniformly distributed via the cool air path and by low-speed rotation of the cool air discharge control blade, thus keeping the refrigerator at a predetermined temperature uniformly. Temperature sensors are installed on each side of the refrigeration compartment and the sensed average or representative temperatures are compared with a control reference temperature, so that cool air can be discharged to high temperature areas.

49 Claims, 18 Drawing Sheets

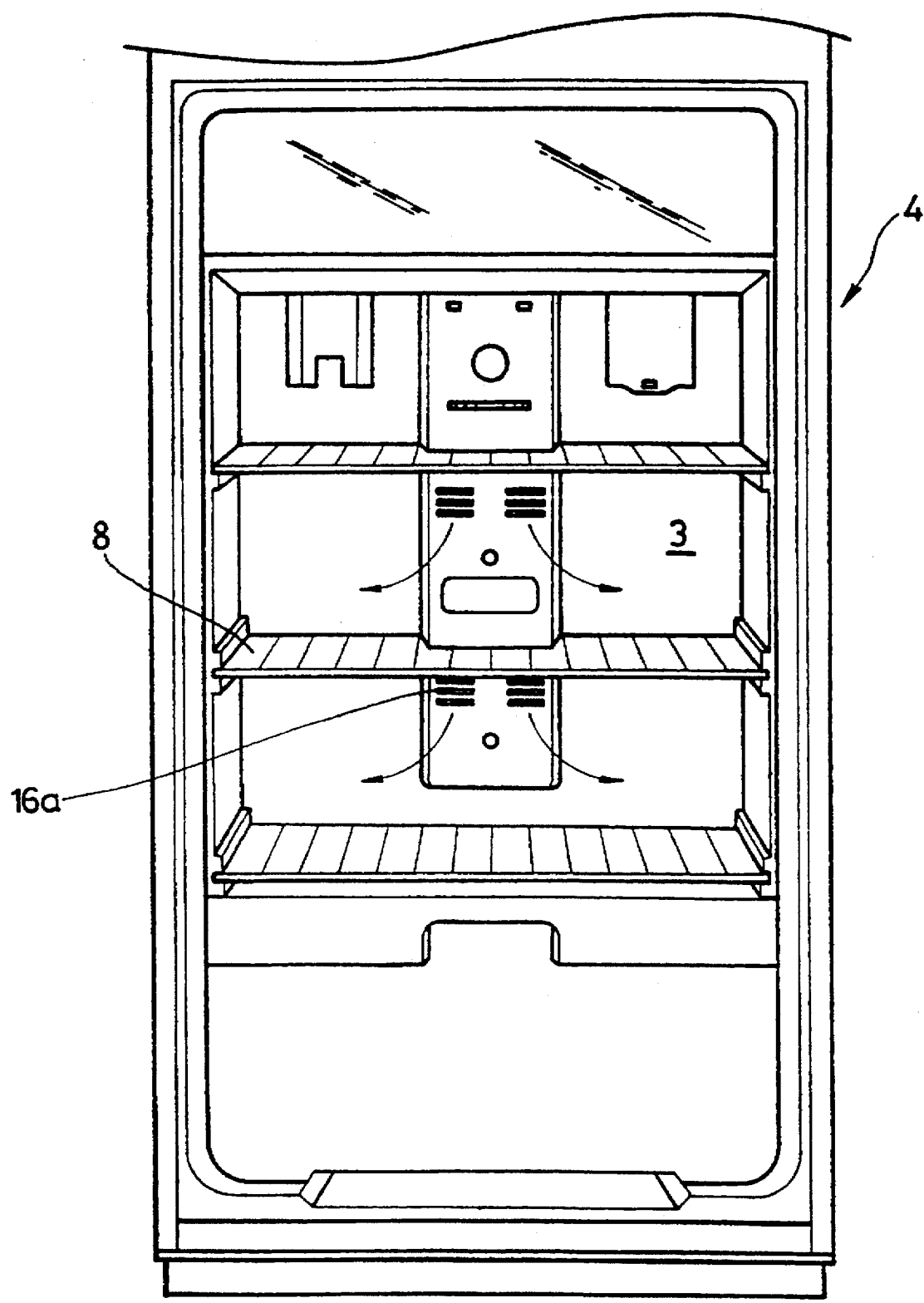
FIG._2
*(PRIOR ART)*

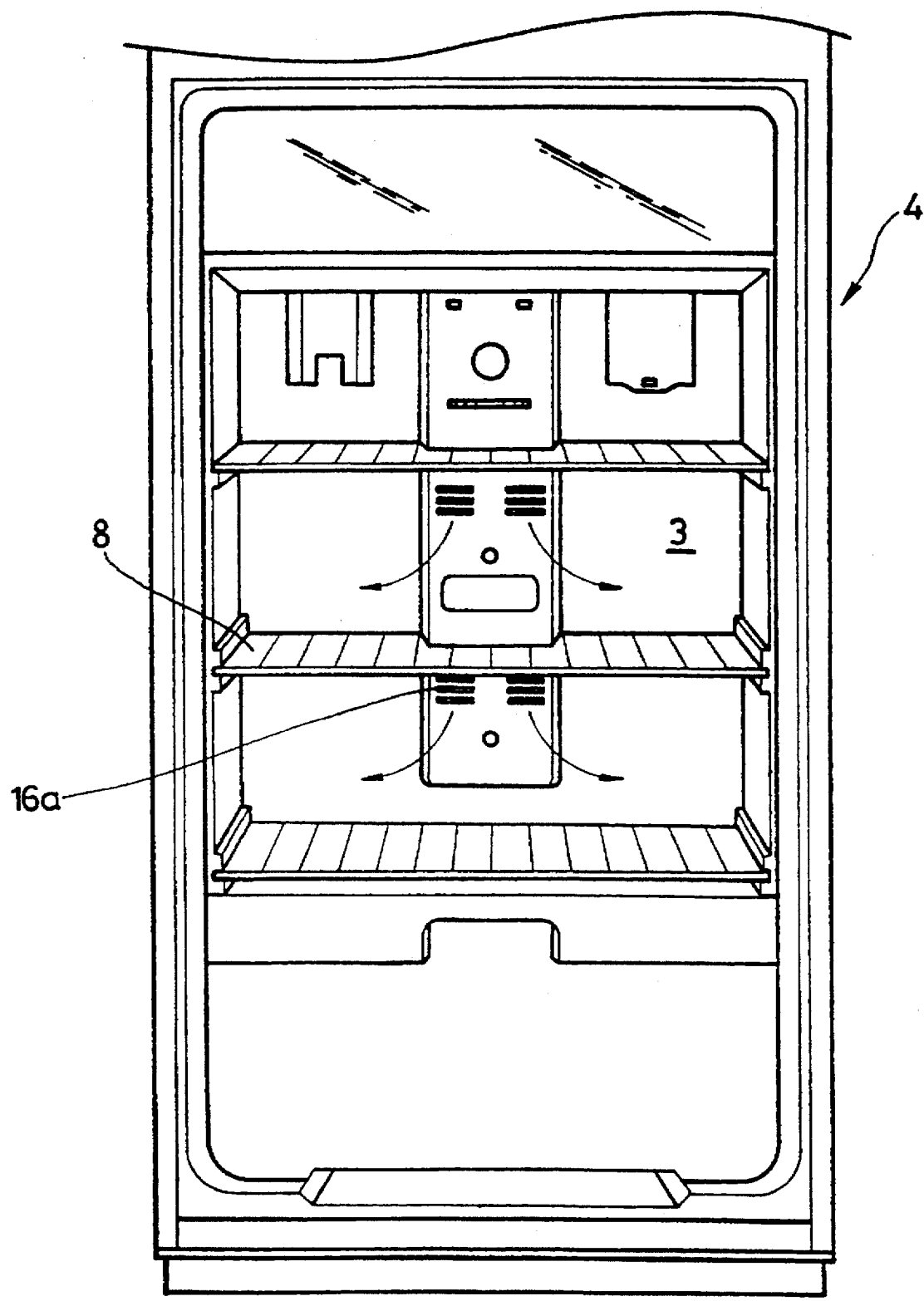
FIG._2
*(PRIOR ART)*

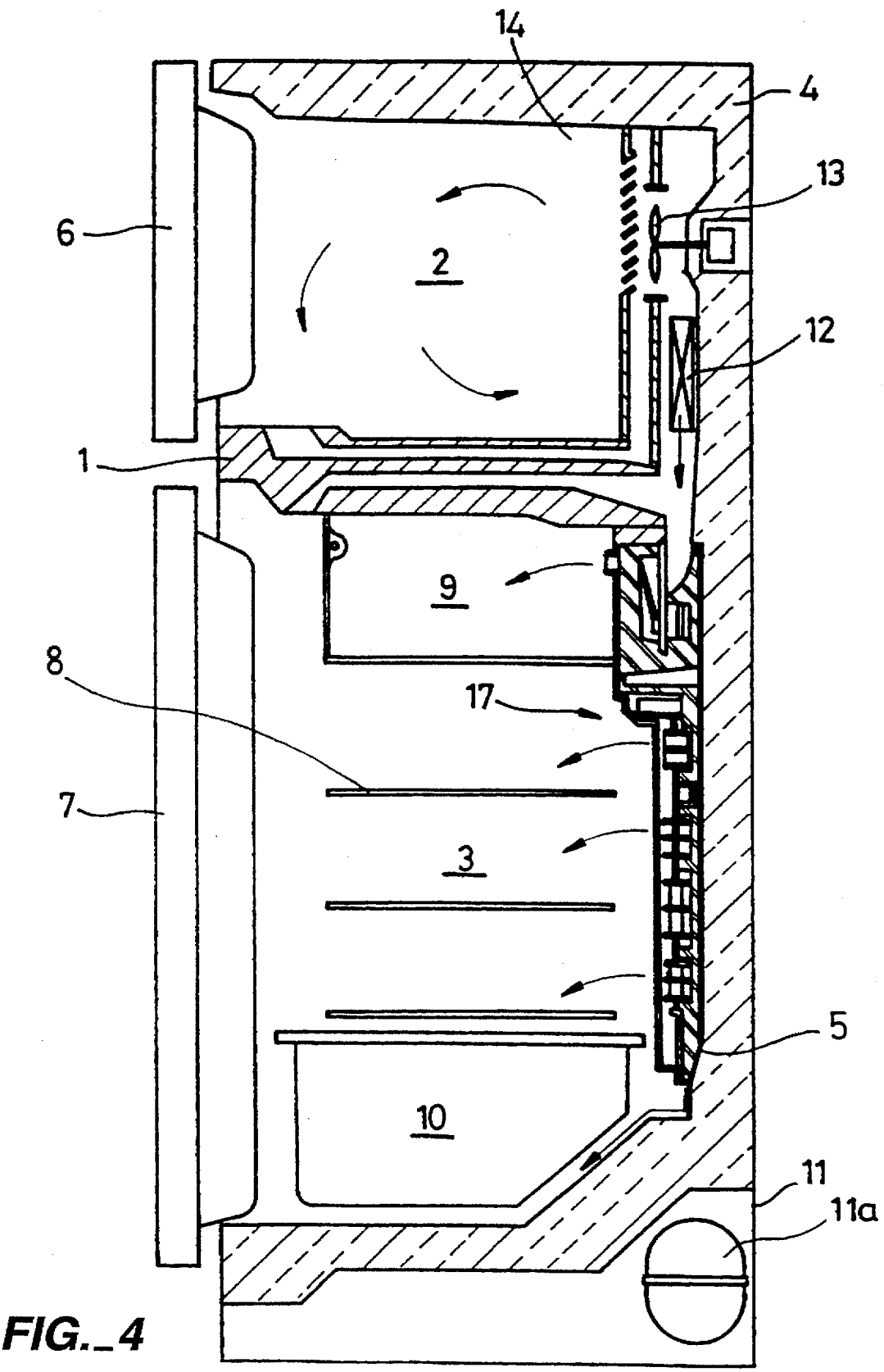
FIG._4

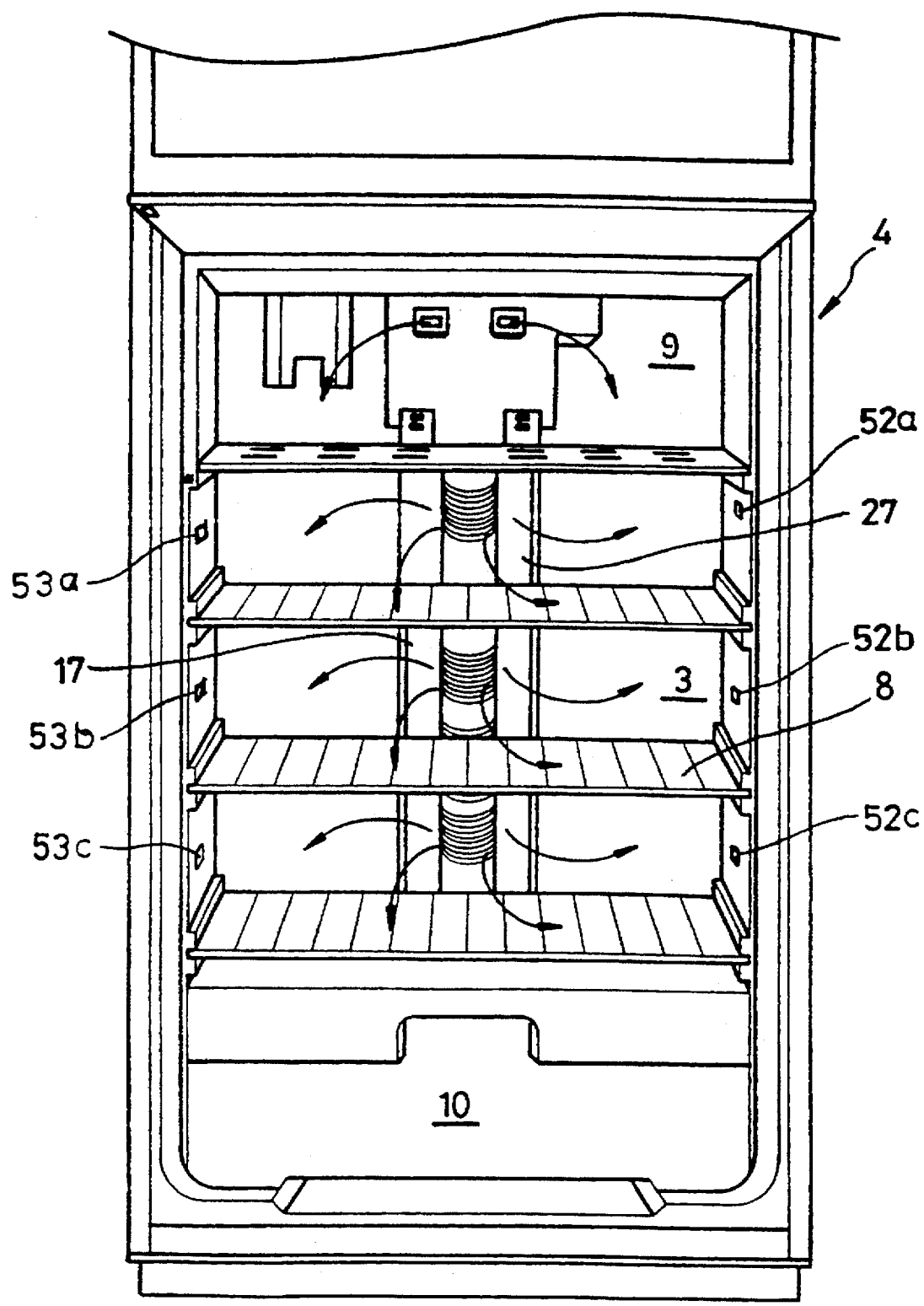
FIG._5

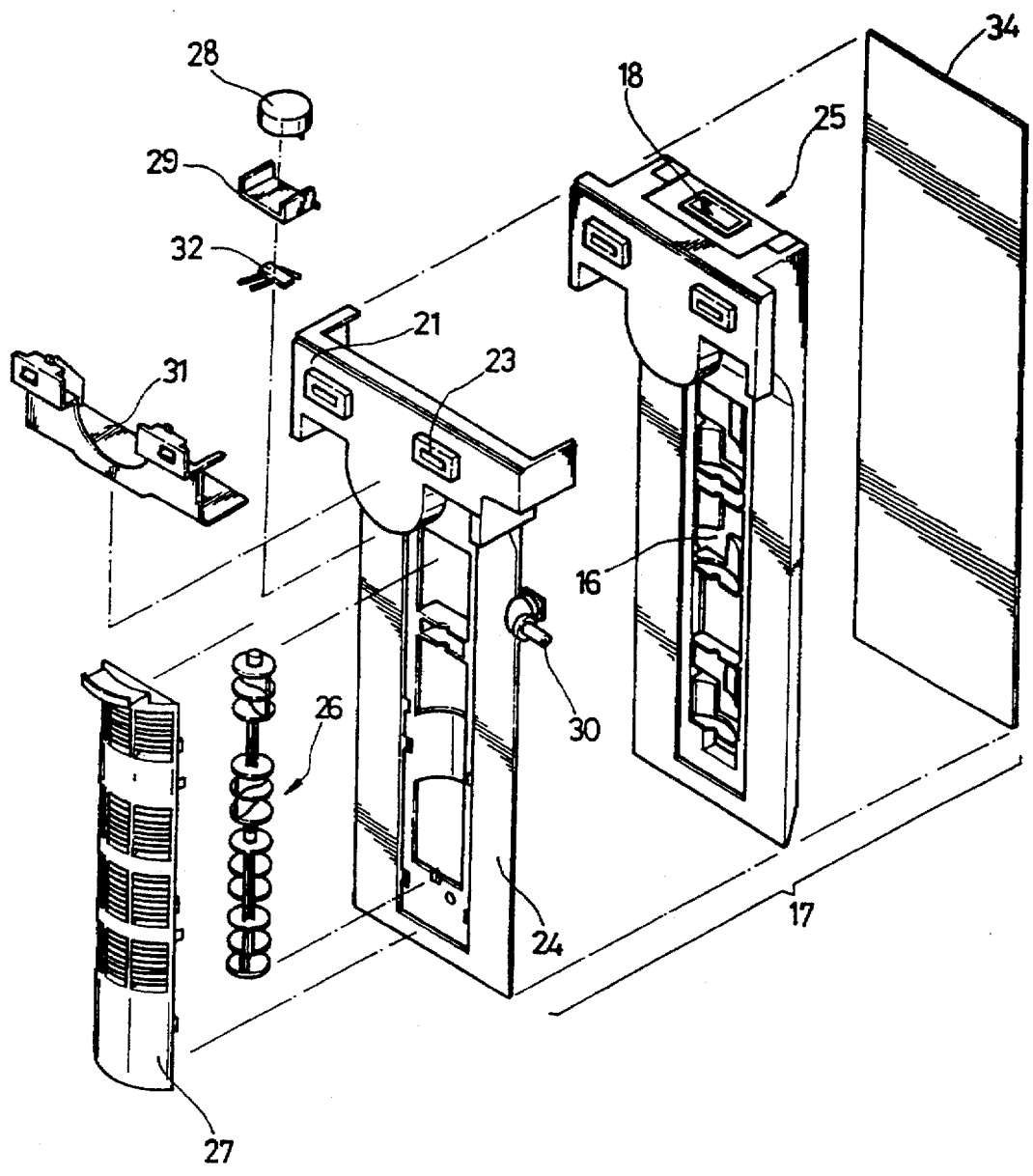
FIG._6

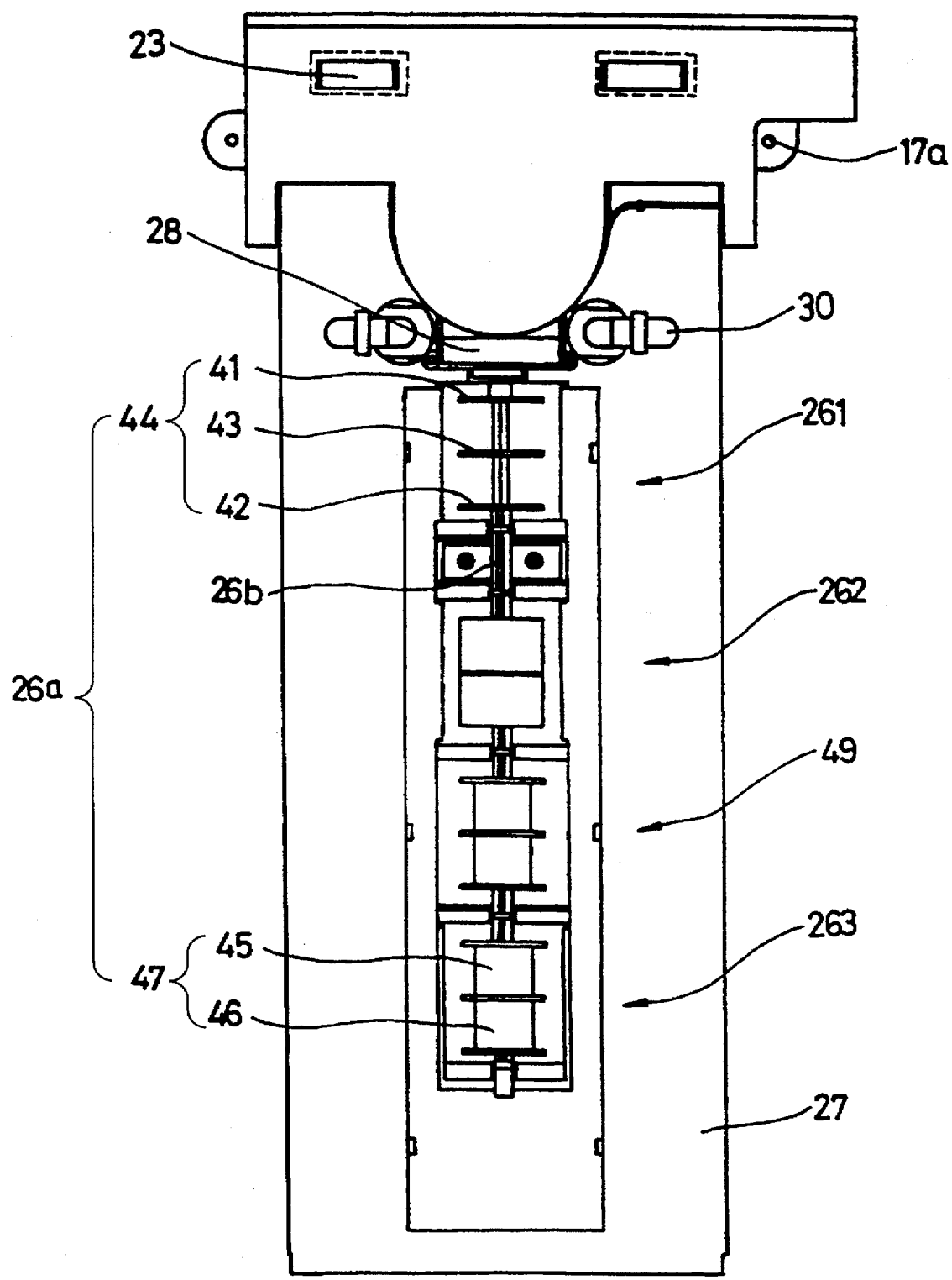
FIG._7A

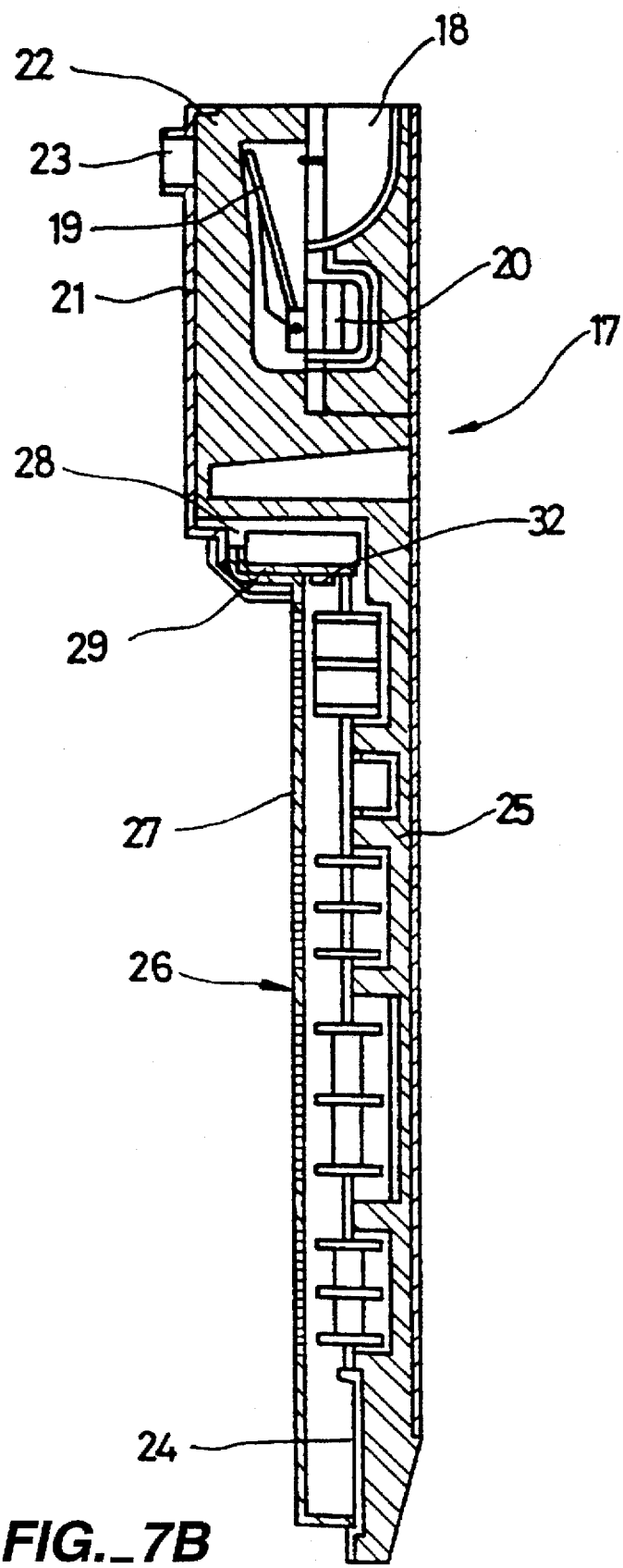
FIG._7B

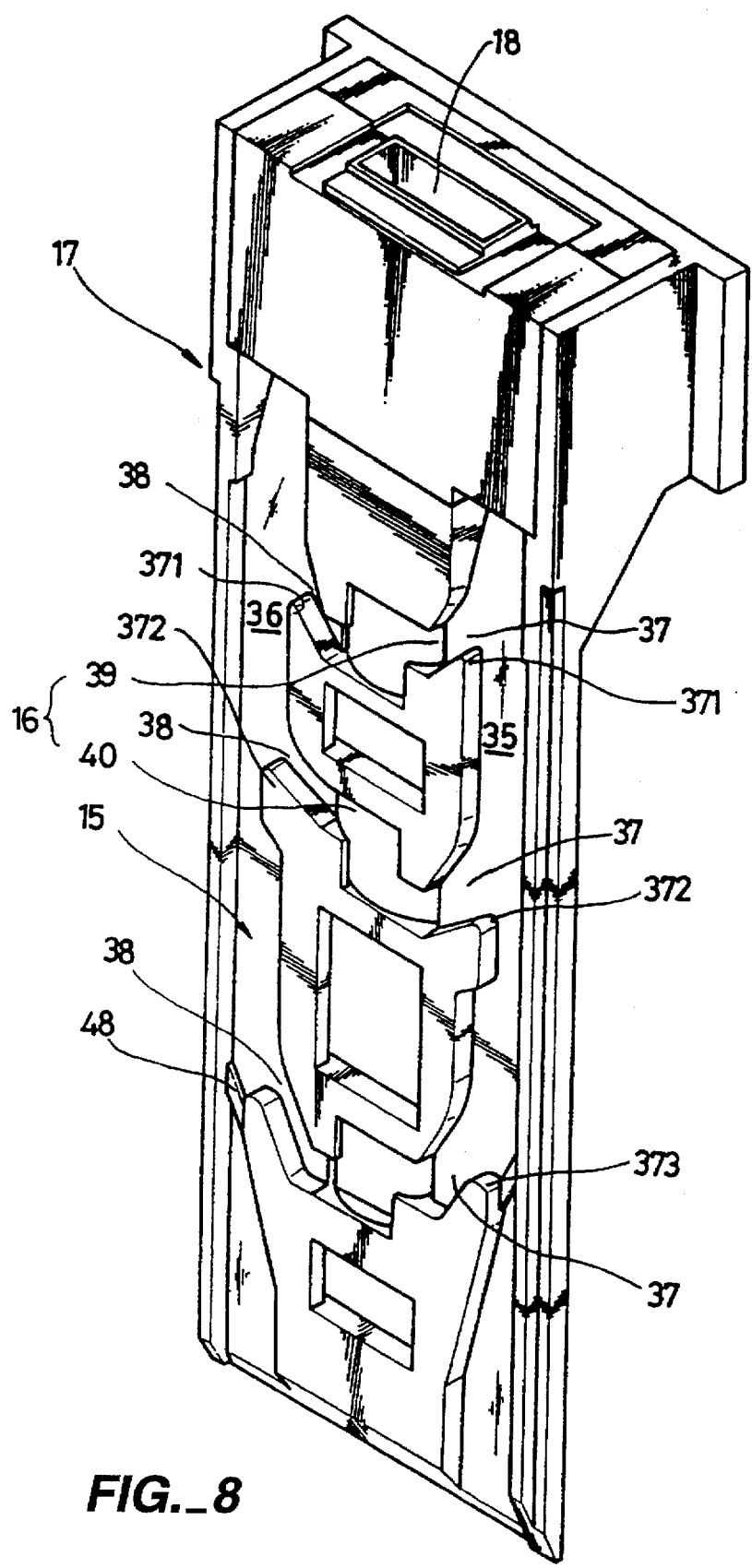
FIG._8

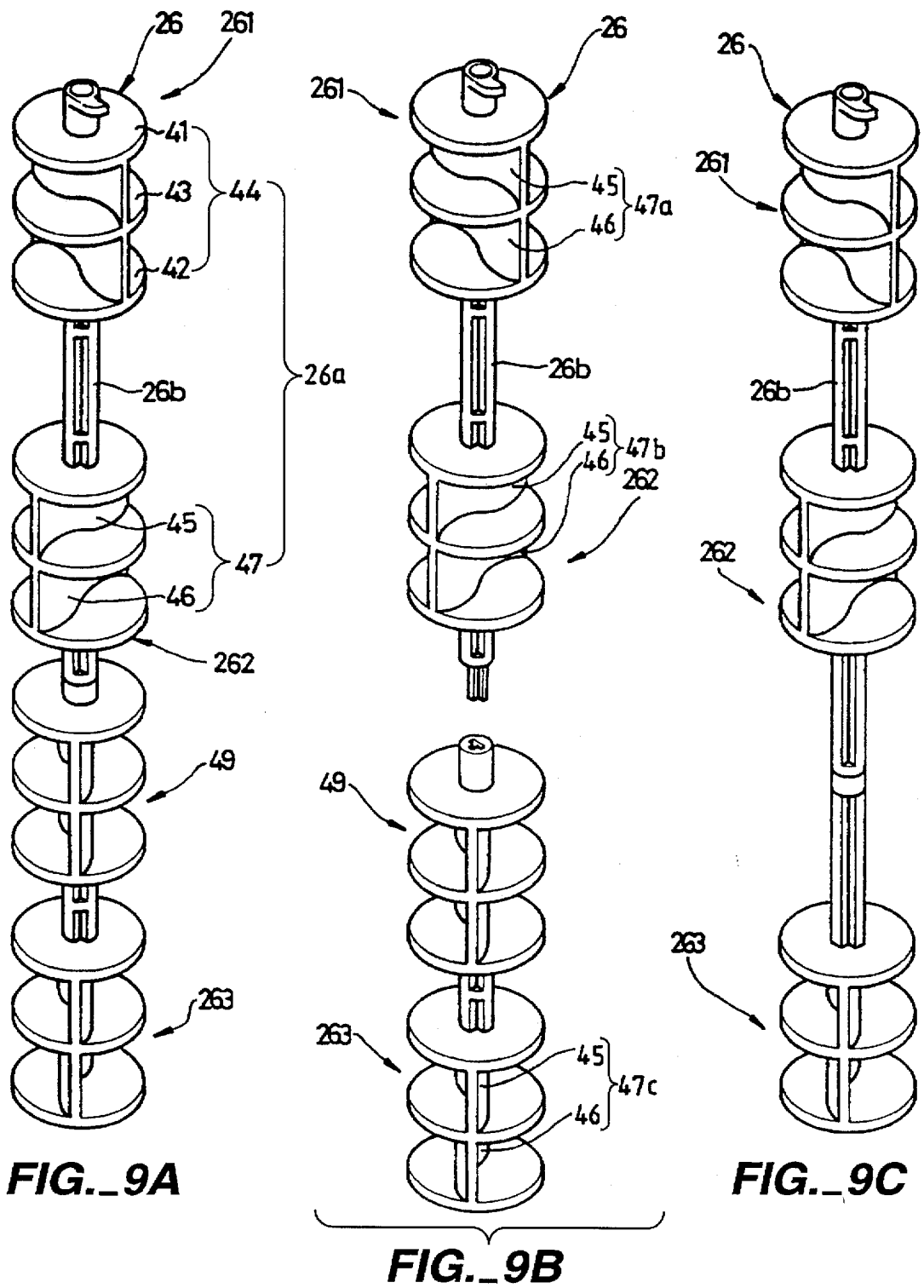
FIG._9A  FIG._9B  FIG._9C

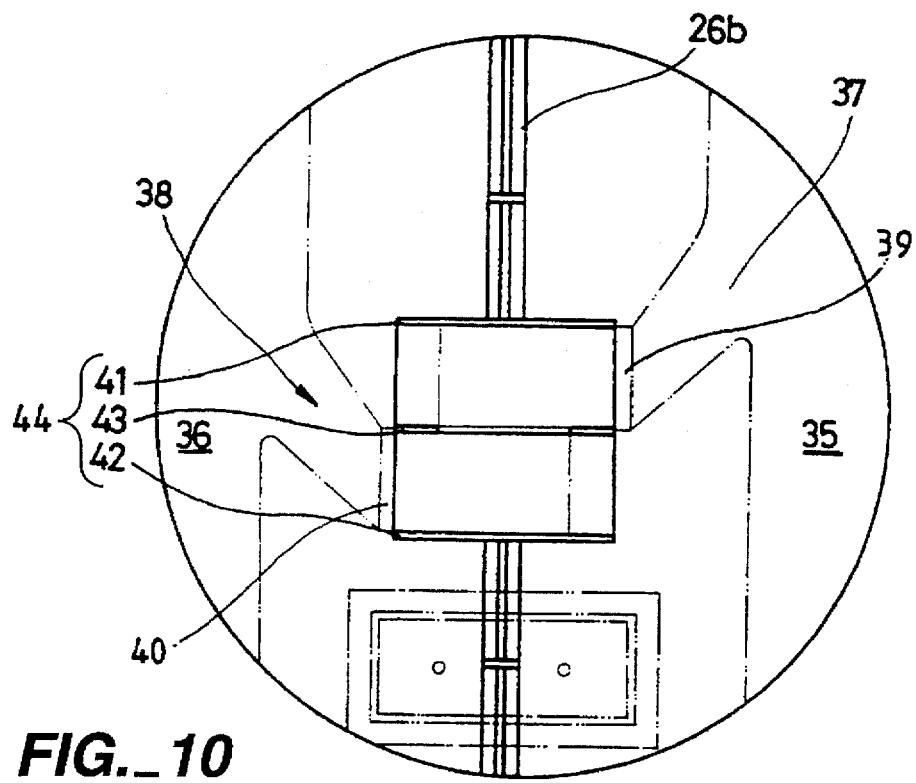
FIG._10
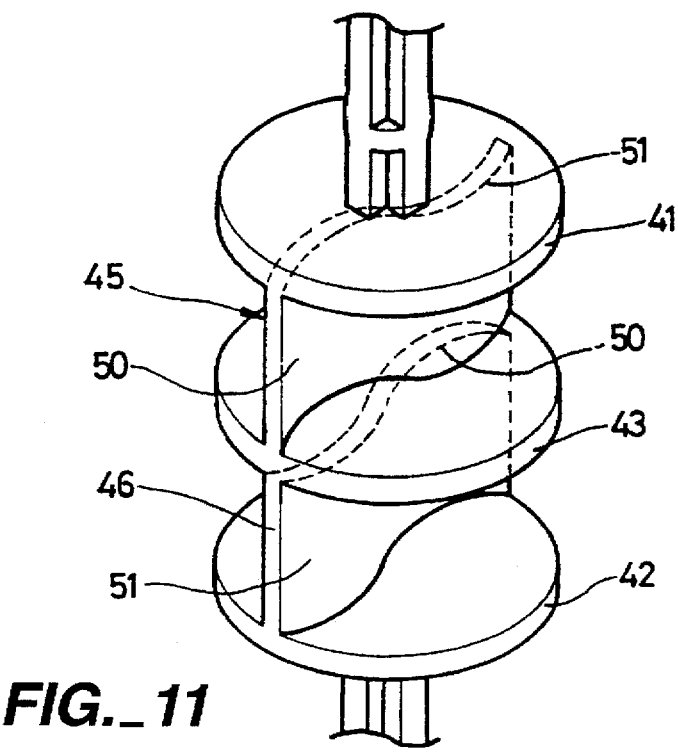
FIG._11

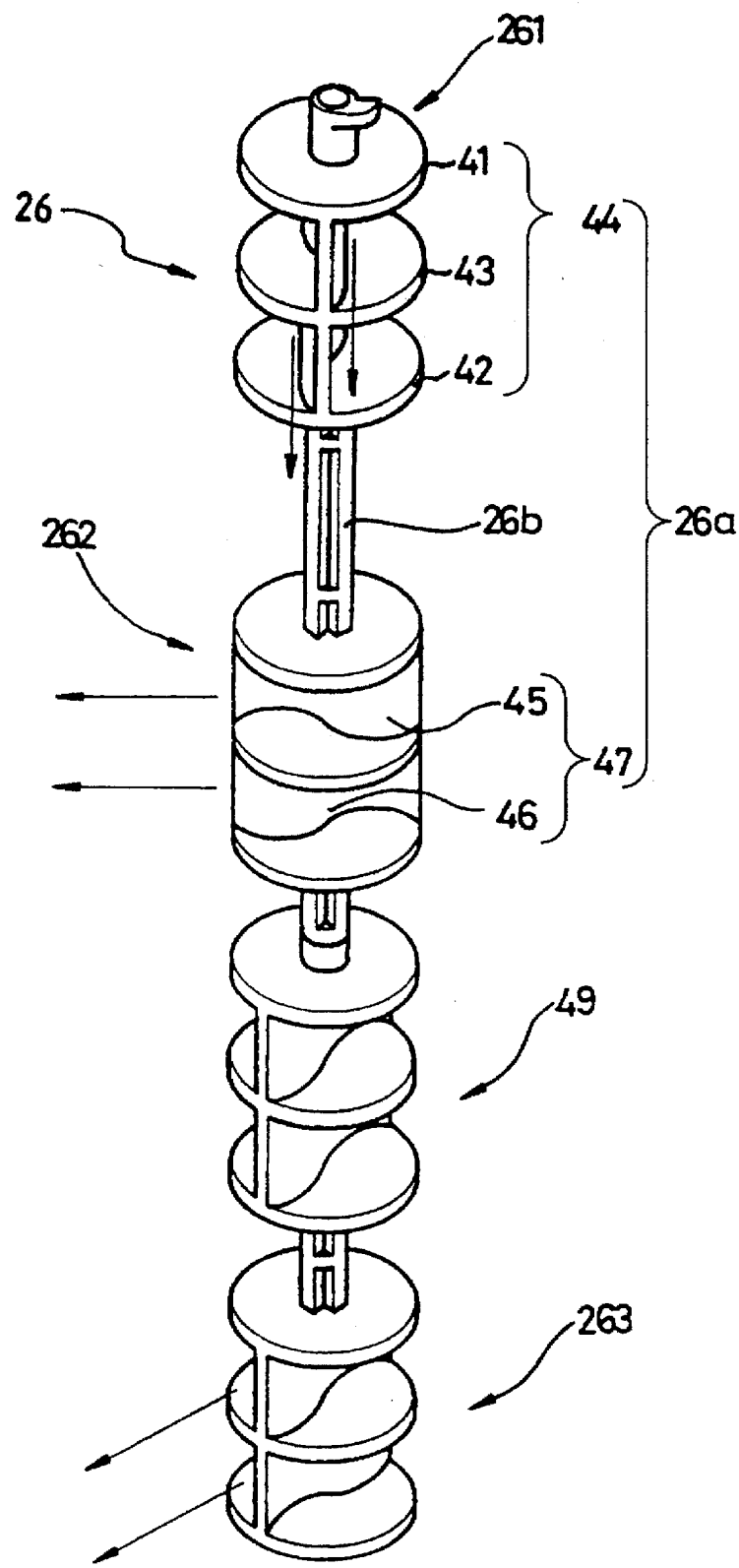
FIG._12A

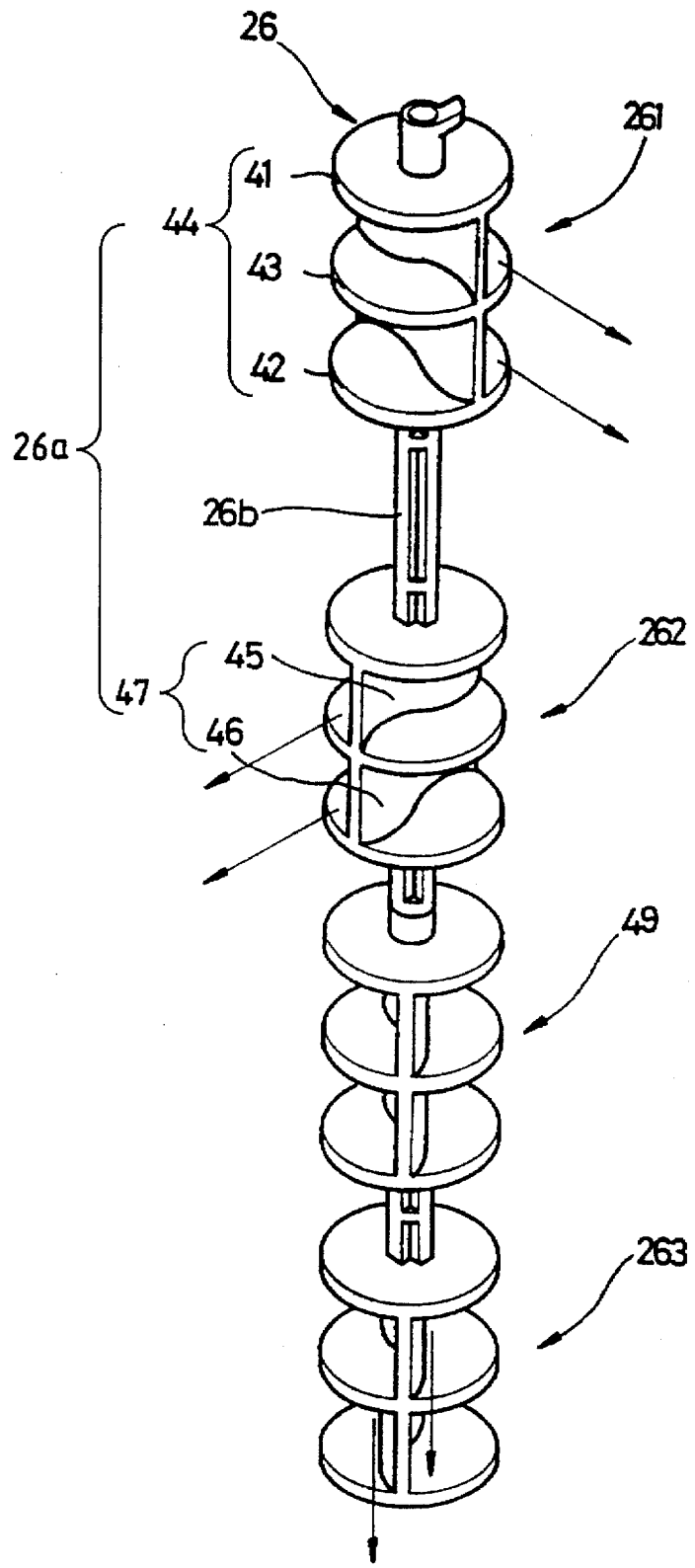
FIG._12B

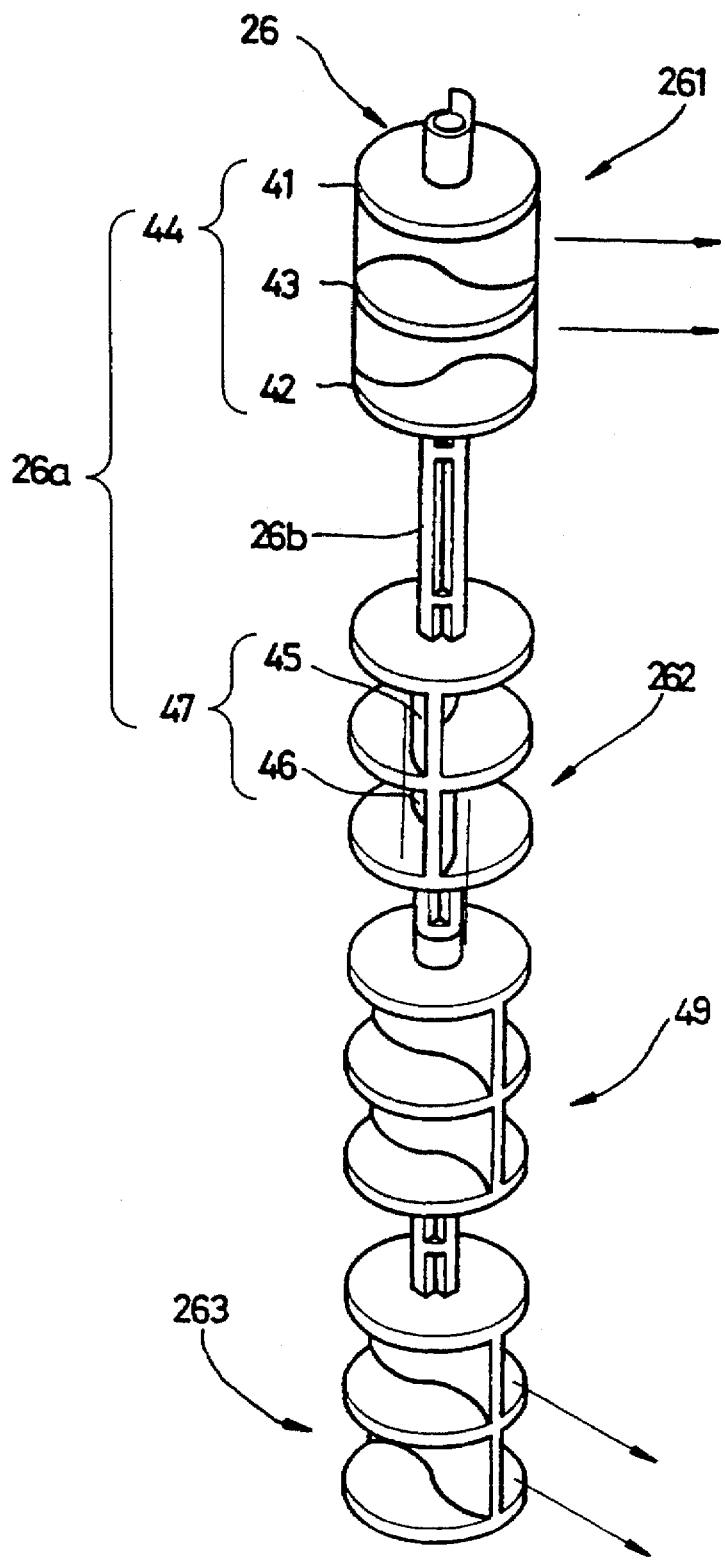
FIG._12C

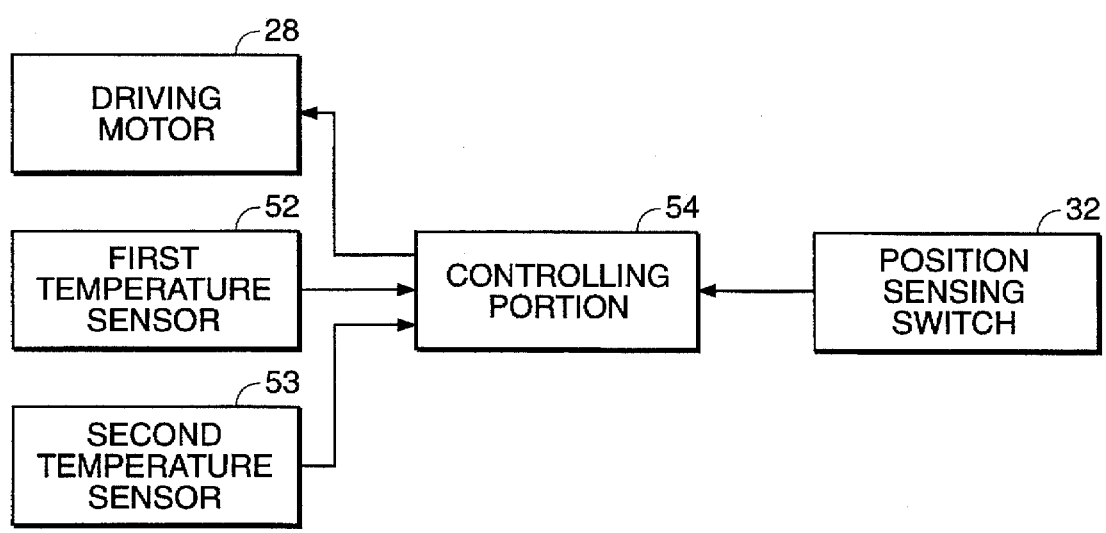
FIG._13

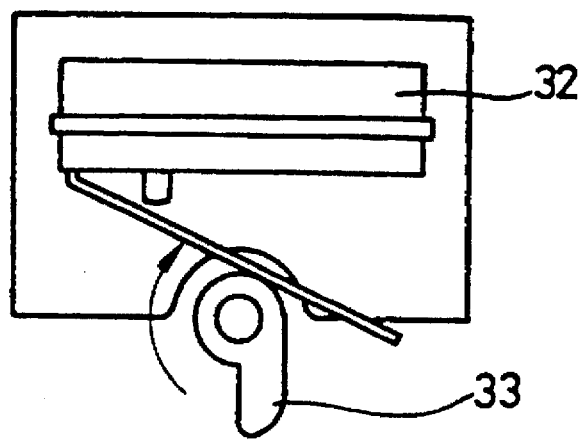
FIG._14A
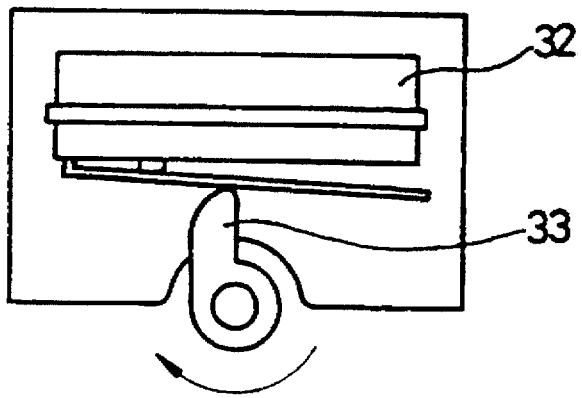
FIG._14B
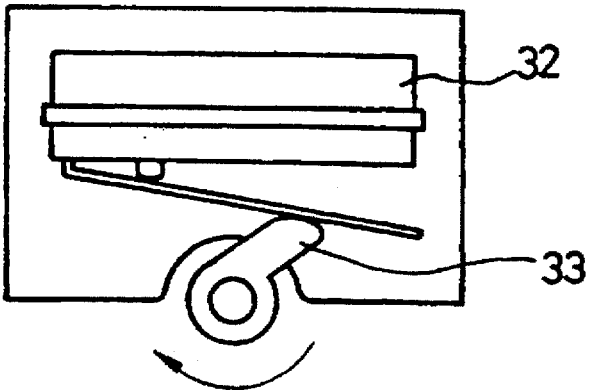
FIG._14C

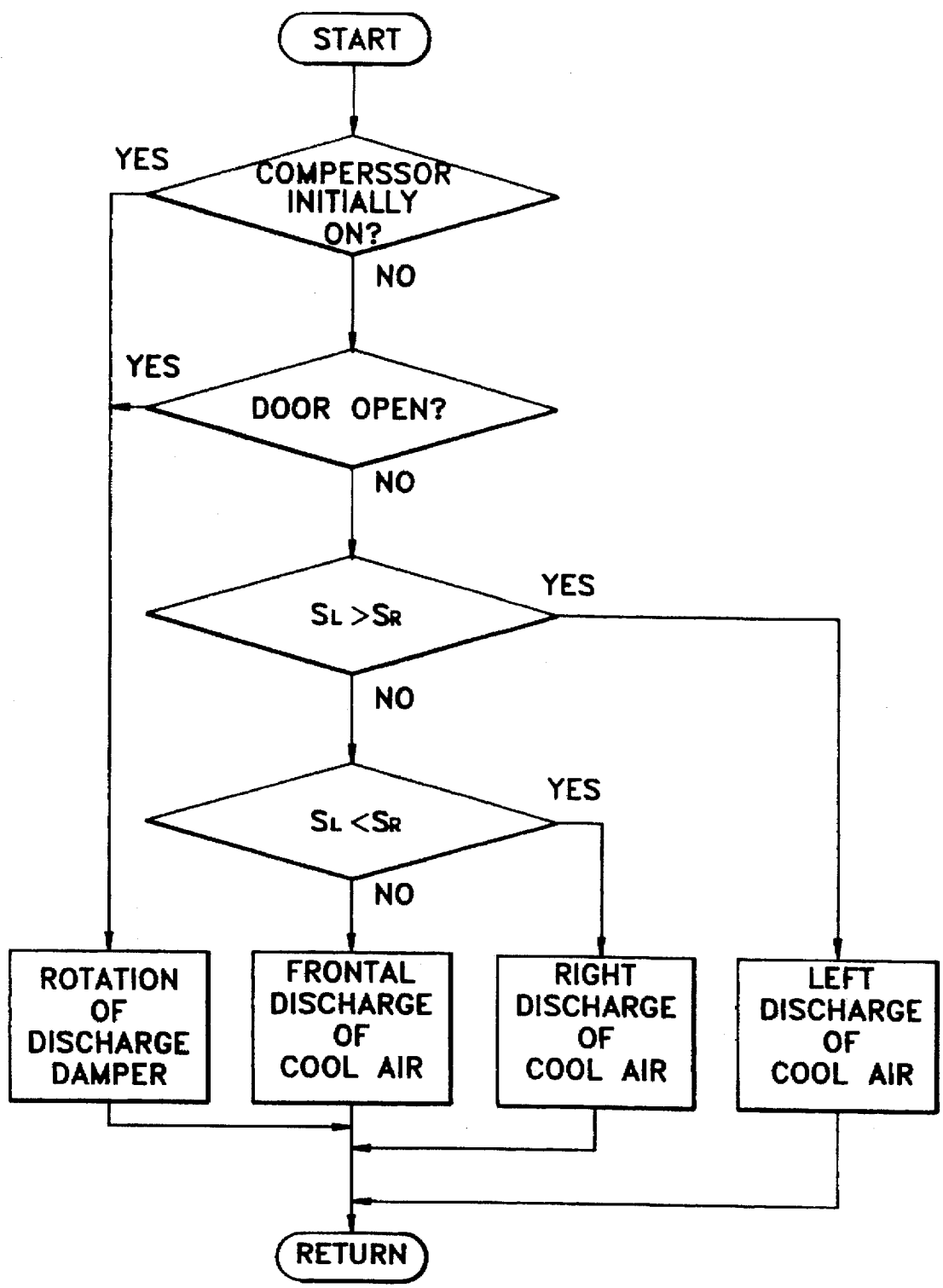
FIG._15

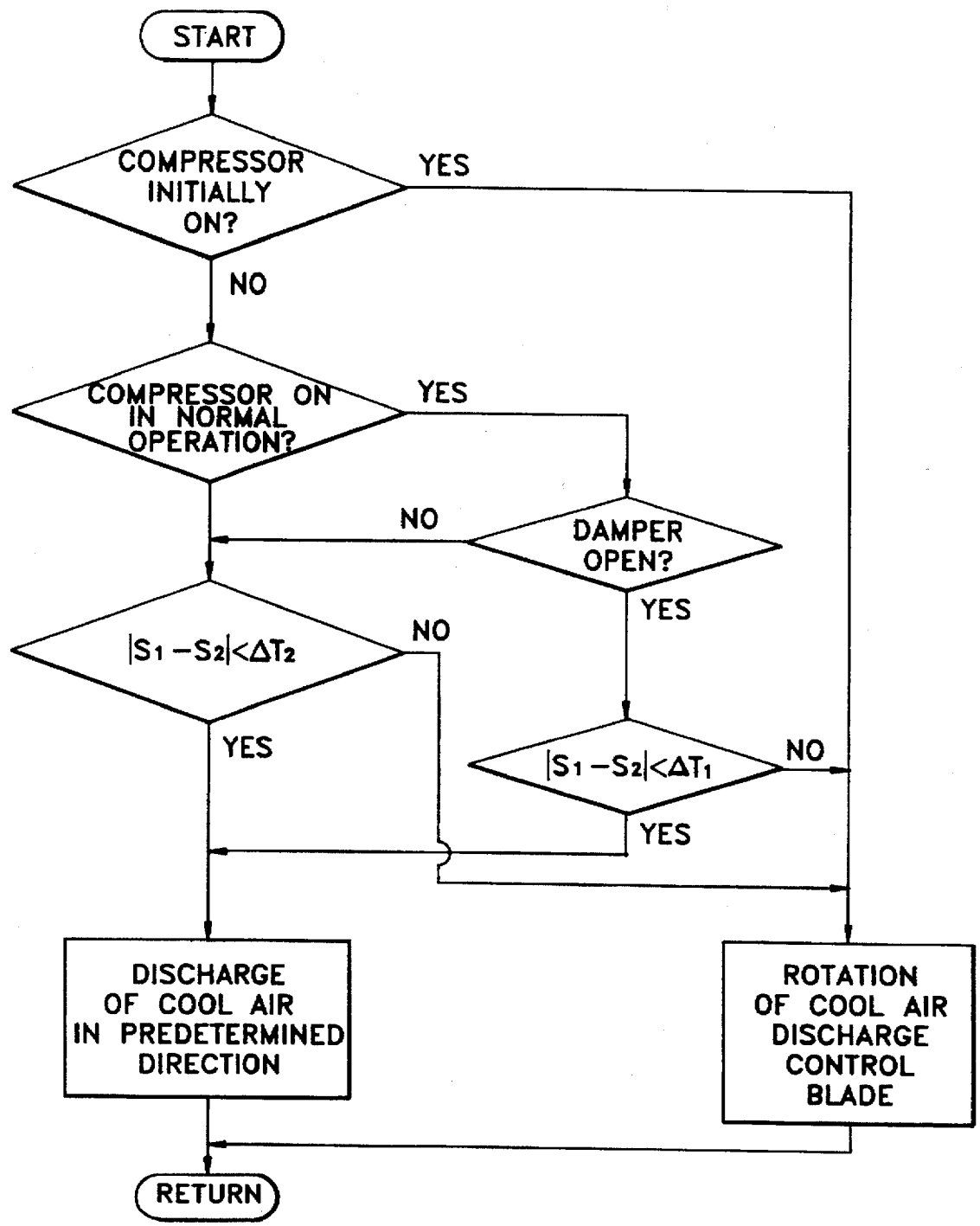
FIG._16

REFRIGERATOR AND METHOD FOR CONTROLLING TEMPERATURE THEREOF BY CONTROLLING COOL AIR DISCHARGE DIRECTION

BACKGROUND OF THE INVENTION

The present invention relates to a refrigerator and a method for controlling temperature thereof, and more particularly, to a refrigerator having a cooling fan and a cool air discharge adjustment blade for distributing the cool air discharged into a refrigeration compartment and controlling the discharge direction thereof, and a method for controlling the temperature of a refrigeration compartment to be rapidly and uniformly distributed by controlling the discharge direction of the cool air into the refrigeration compartment.

As shown in FIG. 1, a refrigerator is generally provided with a body 4 having a freezer compartment 2 and a refrigeration compartment 3 divided by an intermediate bulkhead 1, and doors 6 and 7 for freezer compartment 3 and refrigeration compartment 4 respectively attached to body 4. Body 4 is comprised of a cabinet 4a for defining a whole frame, a liner 4b on the inside of cabinet 4a, and a foam material 4c filling the space between cabinet 4a and liner 4b.

A compressor 11a is installed in a machine compartment 11 in the lower part of the refrigerator. A condenser (not shown) and a pressure-reducer (not shown) are installed in body 4 or in machine compartment 11. An evaporator 12 is installed on the rear wall of freezer compartment 2. The above components are all connected by a refrigerant pipe, thus performing a refrigeration circulation cycle. A cooling fan 13 is installed above evaporator 12, to artificially ventilate cool air produced in evaporator 12 into freezer compartment 2 and refrigeration compartment 3. To guide the cool air, a fan guide 14 is placed in front of cooling fan 13 and a cool air duct 15a is provided along the rear wall of refrigeration compartment 3. A cool air control damper 19 controls the amount of the cool air provided to refrigeration compartment 3. Shelves 8 are provided for storing food.

In general, a conventional refrigerator employs a section-to-section discharge method to provide cool air into every refrigeration compartment. As shown in FIG. 2, cool air discharge holes 16a are arranged vertically on cool air duct 15a provided on the rear wall of refrigeration compartment 3, for respective sections formed by shelves 8, thus discharging cool air into each section. Such a refrigerator, however, exhibits limitations in its effectiveness in achieving uniform refrigeration, since cool air is discharged directly forward from cool air discharge holes 16a, causing large differences in temperature throughout the refrigerator.

To circumvent this problem, a refrigerator adopting a three-dimensional refrigeration method has been suggested. As shown in FIG. 3, this refrigerator has cool air discharge holes 16a on both side walls as well as on the rear wall, for discharging cool air "three-dimensionally." However, the thus-constituted refrigerator also has limitations in maintaining uniform temperature distribution, since the cool air is merely discharged into the refrigerator and not distributed therein. Another problem is that a given area cannot be refrigerated as necessary, since the direction and amount of the discharged cool air cannot be controlled.

The above-described problems of the refrigerators of FIGS. 2 and 3 become more serious concerns when dealing with larger refrigerators.

As an effort to solve the problems, a method of simply distributing the discharged cool air is used. Here, a cool air discharge adjustment blade for determining the discharge direction of cool air into a refrigeration compartment is merely cycled to more evenly distribute the cool air discharged into the refrigeration compartment. Such a method, however, is ineffective for immediately handling various temperature-changing situations. That is, the discharge of cool air cannot be properly controlled on the basis of temperature differences existing between areas of a given section or between sections, which are caused by the temperature of stored food and the opening and closing of compartment doors.

SUMMARY OF THE INVENTION

It is an object of the present invention to provide a refrigerator to overcome the above problems, in which (1) uniform temperature distribution is maintained throughout the interior of the refrigerator, by distributing cool air discharged into the refrigerator or intensively discharging the cool air to a particular area requiring more intensive refrigeration, (2) a drive motor is prevented from malfunction due to the introduction of water and condensation, and (3) the cool air is evenly discharged into the refrigerator even with the low-speed rotation of a cool air control blade, by placing a cool air guiding portion in a cool air discharge hole.

It is another object of the present invention to provide a method for controlling a refrigerator's temperature by controlling a cool air discharge direction in order to rapidly distribute cool air, thus keeping a compartment of the refrigerator at a predetermined temperature.

To achieve the above object, there is provided a refrigerator comprising: a body having a freezer compartment and a refrigeration compartment; an evaporator for producing cool air and providing the cool air to the freezer and refrigeration compartments; a housing installed in a predetermined position of the refrigeration compartment and having a guide path for guiding the cool air from the evaporator into the refrigerator and a cool air path for guiding the cool air downward from the guide path; and a plurality of discharge holes vertically formed in the housing, for guiding the cool air which flows through the cool air path to be dispersedly discharged into the refrigeration compartment.

According to the present invention, the discharge holes are placed in the center of the housing. The cool air path is provided with a first path and a second path in both sides of the discharge holes.

To achieve the above object, there is provided a refrigerator comprising: a body having a freezer compartment and a refrigeration compartment; an evaporator for producing cool air and providing the cool air to the freezer and refrigeration compartments; a housing installed in a predetermined position of the refrigeration compartment and having a guide path for guiding the cool air from the evaporator into the refrigerator and a cool air path for guiding the cool air downward from the guide path; a plurality of discharge holes vertically formed in the housing, for guiding the cool air which flows through the cool air path to be discharged into the refrigeration compartment; a cool air discharge adjustment blade rotatably installed in the housing, for controlling a direction in which the cool air is discharged from the discharge holes; and a driving motor for rotating the cool air discharge adjustment blade.

According to the present invention, the cool air discharge adjustment blade is provided with a distribution plate including an upper plate, a lower plate and a middle plate which are vertically spaced by predetermined distances, and a dispersion guiding blade including a first dispersion guiding blade for vertically connecting the upper and middle plates and a second dispersion guiding blade for connecting the middle and lower plates.

The cool air discharge adjustment blade is provided with a cool air guiding portion including the distribution plate and the dispersion guiding blade, the cool air guiding portion is provided with an upper cool air guiding portion, a middle cool air guiding portion, and a lower cool air guiding portion corresponding to the upper, middle and lower parts of the refrigeration compartment, respectively. All three of these cool air guiding portions are integrally connected by a supporting shaft.

The refrigerator further comprises a first temperature sensor installed in the upper side of one side wall of the refrigerator, a second temperature sensor installed in the lower side of the other side wall of the refrigerator, a position sensing switch for turning on and off in accordance with the rotative position of the cool air discharge adjustment blade, and a control portion electrically connected to the first temperature sensor, the second temperature sensor and the position sensing switch, for determining the rotative position of the cool air discharge adjustment blade.

To achieve the above object, there is provided a refrigerator comprising: a body having a freezer compartment and a refrigeration compartment; an evaporator for producing cool air and providing the cool air to the freezer and refrigeration compartments; a housing installed in a predetermined position of the refrigeration compartment and having a guide path for guiding the cool air from the evaporator to the refrigeration compartment; cool air paths formed at both sides of the housing to be communicated with the guide path and having a first path and a second path to guide the cool air from the guide path; a plurality of discharge holes vertically arranged between the first path and the second path, for guiding the cool air to be discharged into the refrigeration compartment through the cool air paths; a cool air discharge adjustment blade rotatably installed in the front side, for distributing left and right or collecting the cool air from the discharge holes according to the distribution of temperature in the refrigeration compartment; and a driving motor for rotating the cool air discharge adjustment blade.

The refrigerator further comprises a first temperature sensor installed in the upper side of one side wall of the refrigerator, a second temperature sensor installed in the lower side of the other side wall of the refrigerator, a position sensing switch for turning on and off in accordance with the rotative position of the cool air discharge adjustment blade, and a control portion electrically connected to the first temperature sensor, the second temperature sensor and the position sensing switch, for determining the rotative position of the cool air discharge adjustment blade.

Preferably, a portion of the operation protrusion which contacts with the position sensing switch is rounded.

A motor case is installed in the housing above the cool air discharge adjustment blade, for accommodating a driving motor, and a light is installed adjacent to the motor case in the housing.

A concave groove is formed into the rear surface of the refrigeration compartment, for installing the housing, and the front surface of the housing is level with the rear surface thereof.

To achieve the above object, there is provided a refrigerator according to the present invention, comprising: a housing installed on the rear wall of a refrigeration compartment; a cool air path installed in a predetermined position of the housing, for guiding cool air; a plurality of discharge holes communicated with the cool air path; a cool air discharge adjustment blade rotatably installed in each discharge hole; and a driving motor accommodated in a motor case, installed in the housing above the cool air discharge adjustment blade, for driving the cool air discharge adjustment blade.

In the present invention, a position sensing switch is provided below the driving motor to be interlocked with an operation protrusion disposed above the cool air discharge adjustment blade, and a light is installed adjacent to the driving motor.

To achieve the above object, there is provided a refrigerator according to the present invention, comprising: a housing installed on the rear wall of a refrigeration compartment; a cool air path formed in a predetermined position of the housing, for guiding cool air; a plurality of discharge holes communicated with the cool air path; at least one plate member rotatably placed in each discharge hole, for horizontally guiding the cool air discharged from the discharge holes; and a dispersion guiding blade vertically provided on the plate member, for dispersing the cool air.

In the present invention, it is desirable that the cool air path is divided into a first path and a second path parallel to each other.

To achieve the above object, there is provided a refrigerator having a cool air dispersion device installed on the rear wall of a refrigeration compartment, for keeping a uniform temperature distribution in the refrigeration compartment, the refrigerator comprising: a housing; a guide path installed at one side of the housing, for guiding cool air; a first path and a second path in parallel with each other, and provided in the housing, separately from the guide path; a plurality of discharge holes installed between the first path and the second path, respectively communicating with the first path and the second path; a cool air discharge control path rotatably placed in each discharge hole; a grill facing the cool air discharge adjustment blade, for protecting the cool air discharge adjustment blade in order to rotatingly discharge cool air into the refrigeration compartment from the first and second paths when the cool air discharge adjustment blade rotates.

To achieve the above object, there is provided a method for controlling refrigerator temperature by controlling a cool air discharge direction, according to the present invention, the method comprising the steps of: determining whether a refrigerant circulating compressor is initially turned on, when power is applied; determining whether a door of a refrigerator is open, when the compressor is not initially on; discharging cool air to be distributed by rotating a discharge damper with damper control means for controlling the amount of the cool air discharged into a refrigerator, when the compressor is initially on or the door is open; determining whether the average value of temperatures sensed by first temperature sensing means provided in a first position of the refrigerator is larger than the average value of temperatures sensed by second temperature sensing means provided at a second position of the refrigerator to face the first temperature sensing means, when the door is not open; discharging the cool air toward the first temperature sensing means under control of cool air discharge direction controlling means, if the average value of temperatures sensed by the first temperature sensing means is larger than the average value of temperatures sensed by the second temperature sensing means; determining whether the average value of temperatures sensed by the first temperature sensing means is smaller than the average value of temperatures sensed by the second temperature sensing means, if the average value of temperatures sensed by the first temperature sensing means is not larger than the average value of temperatures sensed by the second temperature sensing means; discharging the cool air toward the second temperature sensing means under control of the cool air discharge direction controlling means, if the average value of temperatures sensed by the first temperature sensing means is smaller than the average value of temperatures sensed by the second temperature sensing means; and discharging the cool air toward the front under control of the cool air discharge direction controlling means, if the average value of temperatures sensed by the first temperature sensing means is equal to the average value of temperatures sensed by the second temperature sensing means.

In the present invention, it is preferable that the steps of comparing the average value of temperatures sensed by the first temperature sensing means with the average value of temperatures sensed by the second temperature sensing means further comprise the step of calculating the average values of the temperatures sensed by the first and second temperature sensing means, respectively.

It is also preferable that the steps of comparing the average value of temperatures sensed by the first temperature sensing means with the average value of temperatures sensed by the second temperature sensing means further comprise the steps of comparing the temperatures sensed by the first temperature sensing means with one another and comparing the temperatures sensed by the second temperature sensing means with one another, in order to obtain respective representative values of the temperatures sensed by the first and second temperature sensing means.

To achieve the above object, there is provided a method for controlling refrigerator temperature by controlling a cool air discharge direction, comprising the steps of: determining whether a refrigerant circulating compressor is initially on, when power is applied; determining whether the compressor is on in a normal operation, when the compressor is not initially on; determining whether a damper for controlling the amount of cool air discharged into a refrigerator is open, when the compressor is on in the normal operation; determining whether a control reference temperature for discharge of cool air is larger than the absolute value of a difference in temperatures sensed by two temperature sensing means which are selected from at least two temperature sensing means arranged to face each other a predetermined distance apart, when the damper is open; determining whether a control reference temperature for non-discharge of cool air is larger than the absolute value of a difference in temperatures sensed by the two temperature sensing means, when the compressor is not on in the normal operation or the damper is not open; discharging the cool air in a predetermined direction, when either of the control reference temperature for discharge of cool air and the control reference temperature for non-discharge of cool air is larger than the absolute value of a difference in temperatures sensed by the two temperature sensing means; and rotating a cool air discharge control blade, when the compressor is initially on, or either of the control reference temperature for discharge of cool air and the control reference temperature for non-discharge of cool air is not larger than the absolute value of a difference in temperatures sensed by the two temperature sensing means.

In the present invention, the control reference temperature for discharge of cool air is preferably larger than the control reference temperature for non-discharge of cool air, the control reference temperature for discharge of cool air is 3° C., and the control reference temperature for non-discharge of cool air is 1° C.

BRIEF DESCRIPTION OF THE DRAWINGS

The above objects and advantages of the present invention will become more apparent by describing in detail preferred embodiments thereof with reference to the attached drawings in which:

FIG. 1 is a cross-sectional side view of a general refrigerator;

FIG. 2 is an inner perspective view of a conventional refrigerator employing a cool air section-to-section discharge method;

FIG. 3 is an inner perspective view of a conventional refrigerator employing a three-dimensional refrigeration method;

FIG. 4 is a cross-sectional side view of a refrigerator according to the present invention;

FIG. 5 is an inner perspective view of a refrigeration compartment in the refrigerator of FIG. 4, with the door of the refrigeration compartment opened;

FIG. 6 is an exploded perspective view of a housing and a cool air discharge adjustment blade for dispersedly discharging cool air into the refrigerator of FIG. 4;

FIGS. 7A and 7B are front and side views of the cool air discharge portion shown in FIG. 4, respectively;

FIG. 8 is a perspective view of the rear side of the refrigerator housing shown in FIG. 4A, showing an arrangement relationship between cool air paths and cool air discharge holes;

FIGS. 9A, 9B and 9C are views of the cool air discharge adjustment blade shown in FIG. 4;

FIG. 10 is a view showing an arrangement relationship between the discharge holes and the cool air discharge adjustment blade in the refrigerator of FIG. 4;

FIG. 11 is a plan view of the cool air discharge adjustment blade shown of FIGS. 9A–9C;

FIGS. 12A, 12B and 12C are views showing left-, center- and right-concentrated refrigeration mechanisms in the refrigerator of FIG. 4, respectively;

FIG. 13 is a block diagram showing the constitution of a control portion in the refrigerator of FIG. 4;

FIGS. 14A, 14B and 14C are views showing operations of a position sensing switch of FIG. 6;

FIG. 15 is a flow-chart of a method for controlling the temperature of a refrigerator by controlling a cool air discharge direction, according to an embodiment of the present invention; and FIG. 16 is a flow-chart of a method for controlling the temperature of a refrigerator by controlling a cool air discharge direction, according to another embodiment of the present invention.

DETAILED DESCRIPTION OF THE INVENTION

FIG. 4 is a cross-sectional side view of a refrigerator according to the present invention. As shown in the drawing, the refrigerator is provided with a body 4 of an insulation structure having a freezer compartment 2 and a refrigeration compartment 3 divided by an intermediate bulkhead 1, and doors 6 and 7 attached to body 4 for freezer compartment 2 and refrigeration compartment 3, respectively. A plurality of shelves 8 are provided for storing food in refrigeration compartment 3. An auxiliary compartment 9 for storing food at a particular temperature is located above refrigeration compartment 3 and a crisper 10 is located below refrigeration compartment 3. A compressor 11a is installed in a machine compartment 11 below refrigeration compartment 3. A condenser (not shown) and a pressure-reducer (not shown) are installed in body 4 or installed in the machine compartment. An evaporator 12 is installed on the rear wall of freezer compartment 2. The above components are all connected by a refrigerant pipe, thereby to perform a refrigeration circulation cycle.

A cooling fan 13 is installed above evaporator 12 to forcibly ventilate cool air produced in evaporator 12 into freezer compartment 2 and refrigeration compartment 3. A fan guide 14 is disposed in front of cooling fan 13 to guide the cool air. A housing 17 having a cool air path 15 and discharge holes 16 is installed on the rear wall of refrigeration compartment 3. Thus, the cool air is provided from evaporator 12 to freezer compartment 2 and refrigeration compartment 3, separately. A concave groove 5 is formed in the rear wall of refrigeration compartment 3, for installing housing 17.

As shown in FIG. 5, housing 17 is installed in the center of the rear wall of refrigeration compartment 3, such that its upper portion is directly behind auxiliary compartment 9 and the other portion thereof is located immediately behind refrigeration compartment 3 between auxiliary compartment 9 and crisper 10. That is, the upper end of housing 17 is extended to contact middle bulkhead 1 and the lower end thereof is extended a point near crisper 10, thus making housing 17 almost as high as refrigeration compartment 3.

As shown in FIG. 6, housing 17 is comprised of a front plate 24, a similarly shaped thermal insulator 25 combined with front plate 24, and a seal plate 34 attached to the rear surface of thermal insulator 25. A cool air discharge adjustment blade 26 is detachably installed on front plate 24, and a driving motor 28 for driving cool air discharge adjustment blade 26 is installed at one end thereof and housed in a motor case 29. Lights 30 are installed at both sides of driving motor 28, and light covers 31 serve to protect lights 30.

In the embodiment, the introduction of moisture into driving motor 28 is prevented by disposing driving motor 28 above cool air discharge adjustment blade 26, since moisture or condensed water in the refrigerator flow down due to their weights. Further, there is not the remotest possibility of the permeation of the moisture into driving motor 28 and decrease of its driving speed caused by over-freezing, since driving motor 28 is contained in motor case 29. Even if moisture is introduced, the moisture is evaporated immediately by lights 30 installed at both sides of driving motor 28, thereby preventing the break-down of driving motor 28 and thus inactive operation of cool air discharge adjustment blade 26. Though a geared motor having a fixed rotating speed is usually used as the driving motor in the embodiment, a stepping motor may be used instead, to properly control the rotating speed as well as rotation and direction of the cool air discharge adjustment blade.

A position sensing switch 32 is turned on and off by an operating protrusion described later with respect to FIGS. 14A–14C of position sensing switch 32 placed in the upper portion of cool air discharge adjustment blade 26, for controlling the rotative position of cool air discharge adjustment blade 26. Latticed grill 27 is detachably inserted into front plate 24, for protecting cool air discharge blade 26.

Grill 27 serves to prevent stored food in the refrigerator from disturbing the operation of cool air discharge control blade 26.

As shown in FIGS. 7A and 7B, a guide path 18 is formed in the upper end of housing 17, for guiding cool air produced from evaporator 12 into refrigeration compartment 3. A damper 19 for controlling the amount of cool air provided to the refrigeration compartment by opening/closing guide path 18 and a damper motor 20 for driving damper 19 are built in the upper end of housing 17. Temperature in the refrigeration compartment 3 is controlled by using these constituents in a conventional manner. A damper cover 21 is incorporated in front plate 24 in the embodiment and a spacer 22 is formed of an insulating material. Spacer 22 is made thick to prevent condensation on damper cover 21 which results from a large amount of cool air passing through guide path 18. Therefore, the upper part of housing 17 having damper 19 and damper motor 20 installed therein is also made relatively thick and wide, i.e., approximately 12 cm thick and 34 cm wide. Here, though thickness and width of the housing depend on the size of the refrigerator and are preferably 12 cm thick and 34 cm wide for a 400–500 l refrigerator. A cool air discharge hole 23 formed into damper cover 21 serves to discharge cool air from guide path 18 to auxiliary compartment 9. Thus, auxiliary compartment 9 is maintained at a lower temperature than refrigeration compartment 3. Two cool air discharge holes 23 are arranged in this embodiment.

Meanwhile, the other portion of housing 17 is approximately 3 cm thick and 25 cm wide. This portion of housing 17 may be entirely formed of a plastic injected material. In the embodiment, this portion is constituted of 2 mm-thick front plate 24 of a plastic injected material and a thermal insulator of, for example, polystyrene, which are incorporated. Cool air discharge adjustment blade 26 is installed at these portions of housing 17 and comprised of a cool air guiding portion 26a and a supporting shaft 26b. In the embodiment, four cool air guiding portions 26a are integrally connected with supporting shaft 26b. Cool air guiding portions 26a are placed to correspond to respective sections divided by shelves 8 in refrigeration compartment 3. Assuming that the height of refrigeration compartment 3 is H, the upper cool air guiding portion is placed at ¾ H, the middle cool air guiding portion at ½ H, and the lower cool air guiding portion at ⅓ H. A cool air guiding portion between the middle cool air guiding portion and the lower cool air guiding portion is prepared in consideration of the appearance of the cool air guiding portions and mold manufacturing, regardless of positions of shelves 8. The constitution of cool air discharge adjustment blade 26 will be described later in more detail.

Housing 17 is installed as an assembly body on the surface of the rear wall of refrigeration compartment 3. It is desirable to install housing 17 so that the front plate of housing 17 is level with the surface of the rear wall of refrigeration compartment 3. That is, after front plate 24 and thermal insulator 25 are incorporated and seal plate 24 is attached to thermal insulator 25, cool air discharge adjustment blade 26 and grill 27 are combined in front plate 24, driving motor 28 and lights 30 are combined, and then they are installed onto the rear wall of refrigeration compartment 3. Thus, installation is facilitated, as compared with separately installing each constituent in a refrigeration compartment. A screw combining portion 17a is used for installing housing 17. That is, since housing 17 is an assembly body, housing 17 is easily installed on the rear wall of refrigeration compartment 3 through screw-combination.

As shown in FIG. 8, cool air path 15 and discharge holes 16 are formed in housing 17, for guiding cool air from evaporator 12 to refrigeration compartment 3. Cool air path 15 is formed longitudinally along the rear side of housing 17 and discharge holes 16 are formed through housing 17 to communicate cool air path 15 with refrigeration compartment 3. A plurality of discharge holes 16 are arranged vertically in the center of housing 17, and cool air path 15 includes a first path 35 and a second path 36 formed at both sides of discharge holes 16. The plurality of discharge holes 16 are vertically arranged to correspond to respective sections (that is, spaces divided by shelves 8) like cool air guiding portions 26a of cool air discharge adjustment blade 26. In the embodiment, cool air guiding portions 26a of cool air discharge adjustment blade 26 are placed into discharge holes 16. Therefore, there are three discharge holes in this case. This constitution makes housing 17 relatively thin on the whole and, thus, the portion of housing 17 which protrudes into the refrigerator is shorter. As a result, the effective area of the refrigerator increases.

First path 35 and second path 36 are extended upward and downward so that their upper ends are placed on opposite sides of guide path 18 and their lower ends are connected to crisper 10. Therefore, cool air which has passed through guide path 18 by opening damper 19 flows down separately through first path 35 and second path 36 to refrigeration compartment 3 and crisper 10. A portion of the cool air is discharged through cool air discharge holes 23 into auxiliary compartment 9. Cool air path 15 for guiding cool air flowing down into refrigeration compartment 3 has first linking paths 37 for linking first path 35 to discharge holes 16 and second linking paths 38 for linking second path 36 with discharge holes 16. Thus, the cool air flowing along first path 35 and second path 36 are partially guided to first linking path 37 and second linking path 38 and discharged through discharge holes 16 into refrigeration compartment 3.

Here, first linking path 37 and second linking path 38 are formed so that their inlets connected to first and second paths 35 and 36 are wider than their outlets connected to discharge holes 16. Especially, the upper parts of first and second linking paths 37 and 38 are rounded and their lower parts are extended more outward than the upper parts by flanges 371, 372 and 373, thereby smoothly guiding the cool air flowing down to these linking paths.

In addition, the upper parts of the inlets of first and second linking paths 37 and 38 are preferably more rounded and their lower parts are extended more outward, in lower portions of first and second linking paths 37 and 38. Thus, the difference in temperatures of areas in refrigeration compartment 3, which depends on their heights, is reduced by discharging more cool air downward through linking paths 37 and 38, and discharge holes 16 into refrigeration compartment 3, since as cool air is discharged earlier, the temperature of the cool air is higher.

The amount of the cool air provided to crisper 10 is decreased while the amount of the cool air provided to refrigeration compartment 3 is increased, by preparing restriction protrusions 48 to a predetermined height in the lower ends of first and second paths 35 and 36, more specifically, in the lower parts of the inlets of lower first and second linking paths 37 and 38.

Meanwhile, discharge holes 16 are provided with first discharge portions 39 directly connected to first linking path 37 and second discharge portions 40 directly connected to second linking path 38 to make the cool air discharged into refrigeration compartment 3 flow separately, left and right.

Preferably, first discharge portion 39 and second discharge portion 40 are stepped and communicate with each other. That is, the cool air guided to both discharge portions is discharged in mutually opposite directions and is smoothly distributed in refrigeration compartment 3, by forming first discharge portions 39 to be eccentric toward first linking path 37 and second discharge portions 40 to be eccentric toward first linking path 38, both being stepped with each other. It is also desirable that first discharge portion 39 exchanges positions with second discharge portion 40 in adjacent discharge holes 16. That is, if upper discharge hole 16 has first discharge portion 39 in a higher place than second discharge portion 40, middle discharge hole 16 has second discharge portion 40 in a higher place than first discharge portion 39. Thus, because the temperature of cool air which is discharged first and flows downward is generally higher than that of cool air discharged later, if the temperature of the cool air introduced from the right is lower than that from the left in the upper discharge hole, the cool air of lower temperature is introduced into the left side of the middle discharge hole, so that a temperature difference between the left and right sides of the refrigerator is eliminated, thereby achieving uniform refrigeration throughout the refrigeration compartment.

Referring to FIGS. 9A, 9B and 9C, cool air discharge adjustment blade 26 employed in the embodiment and its exemplary modifications will be described. Cool air discharge adjustment blade 26 is comprised of a plurality of cool air guiding portions 26a and supporting shaft 26b, as shown in FIGS. 9A–9C. Cool air guiding portion 26a is provided with a distribution plate 44 having an upper plate 41, a lower plate 42, and a middle plate 43 which are disk-shaped and separated from one another by predetermined distances, and a dispersion guiding blade 47 including a first dispersion blade 45 for connecting upper and middle plates 41 and 43, and a second dispersion guiding blade 46 for connecting middle and lower plates 43 and 42. In the embodiment, cool air discharge adjustment blade 26 is comprised of three assembly bodies, each having distribution plate 44 and dispersion guiding blade 47 (the other one being false and described later) and supporting shaft 26b connected to the three assembly bodies, all of them being incorporated. That is, cool air discharge adjustment blade 26 is comprised of three cool air guiding portions 26a having distribution plates 44, dispersion guiding blades 47, and supporting shaft 26b. The upper end of cool air discharge adjustment blade 26 is connected to the output shaft of driving motor 28. Therefore, cool air discharge adjustment blade 26 rotates by the rotative force of driving motor 28. Here, supporting shaft 26b preferably has a cross-shaped section to prevent warpage.

False-cool air guiding portion 49 has nothing to do with cool air discharge, as in FIGS. 9A and 9B, since no discharge hole is formed where it is installed. However, false-cool air guiding portion 49 is effective in distributing the cool air which has leaked through gaps between discharge holes and cool air discharge adjustment blade 26. Further, false-cool air guiding portion 49 contributes to a balanced arrangement of cool air guiding portions, thus contributing to the overall appearance of the cool air guiding portions.

As shown in FIG. 9B, cool air discharge adjustment blade 26 is separably formed in order to overcome problems encountered in manufacturing molds. Cool air discharge adjustment blade 26 is comprised of an upper cool air discharge adjustment blade having an upper cool air guiding portion and a middle cool air guiding portion, and a lower cool air discharge adjustment blade including a false-cool air guiding portion and a lower cool air guiding portion. That is, as described later, since incorporated molding is difficult to obtain when the dispersion guiding blade of each cool air guiding portion is disposed at a different angle, cool air discharge adjustment blade 26 is divided into two parts. Two cool air guiding portions having dispersion guiding blades disposed at a regular angle are arranged in the upper cool air discharge adjustment blade and cool air guiding portions having dispersion guiding blades disposed at the same angle are arranged in the lower cool air discharge adjustment blade. Thus, arrangement of the entire dispersion guiding blades can be controlled by controlling the combination angle at which the upper cool air discharge adjustment blade and the lower cool air discharge adjustment blade are combined. In the embodiment, the dispersion guiding blades of the lower cool air discharge blade are placed in the right center of both dispersion guiding blades of the upper cool air discharge blade. FIG. 9C is a view of an exemplary modification, showing cool air discharge adjustment blade 26 having no false-cool air guiding portion.

On the other hand, as described above, each distribution plate is placed in each discharge hole 16 and the positions of distributing plate 44 and discharge hole 16 correspond to the positions of shelve 8 of refrigeration compartment 3. As shown in FIG. 10, middle plate 43 of distribution plate 44 is located at the boundary between first and second discharge portions 39 and 40 of discharge hole 16. Upper plate 41 is placed over middle plate 43 by the height of first discharge portion 39, and lower plate 42 is placed under middle plate 43 by the height of second discharge portion 40. Further, it is preferable that upper, middle and lower plates 41, 43 and 42 are of the same diameter which is approximately the width of discharge hole 16, to prevent leakage of the cool air. As a result, middle plate 43 and upper plate 41 or middle plate 43 and lower plate 42 form an extra round path extended from the linking paths 37 and 38 in cooperation with dispersion guiding plate 47, so that the cool air is guided to be discharged into the refrigerator and the discharged cool air is uniformly distributed into the refrigerator. That is, upper, lower and middle plates 41, 42 and 43 of distribution plate 44 guide the cool air which has passed through linking paths 37 and 38 from cool air paths 35 and 36 to be discharged into the refrigerator, not to flowing down. Thus, even if cool air discharge adjustment blade 26 rotates at a low speed, distribution plate 44 serves to collect the guided cool air and then discharge the cool air into the refrigerator.

As shown in FIG. 11, first and second dispersion guiding plates 45 and 46 are plane-symmetrical with each other as well as each of both dispersion guiding blade is rotation-symmetrical in itself. In detail, first and second dispersion guiding plates 45 and 46 have respective concave portions 50 and convex portions 51 which are made round continuously.

That is, rounded concave and convex portions 50 and 51 are smoothly connected in a "S" shape. Thus, the cool air flowing along dispersion guiding plate 47 through discharge holes 16 can smoothly circulate without any resistance. Also, first and second dispersion guiding plates 45 and 46 are plane-symmetrical with each other, centering on middle plate 43. Namely, concave portions 50 of first and second dispersion guiding plates 45 and 47 or convex portions 51 of first and second dispersion guiding plates 45 and 47 are arranged to be opposite to each other. Dispersion guiding plate 47 is constituted as above for the purpose of decreasing flowing resistance in cooperation with first and second discharge portions 39 and 40 of discharge holes 16, both discharge portions being vertically stepped with each other. Thus, the cool air introduced into dispersion guiding plate 47 collides with convex portion 51 and then flows along convex portion 51, thereby considerably decreasing the cool air flowing resistance. When first discharge portion 39 of discharge hole 16 is eccentric toward the left, convex portion 51 of first dispersion guiding plate 45 is located in the right. In this case, second discharge portion 40 is eccentric toward the right and convex portion 51 of second dispersion guiding plate 46 is located in the left. For example, the cool air introduced into first discharge portion 39 from the left flows while colliding with convex portion 51 of first dispersion guiding plate 45 and the cool air introduced into second discharge portion 40 from the right collides with convex portion 51 of second dispersion guiding plate 46, thereby flowing into a main stream.

Also, as described above with reference to FIGS. 9A–9C, a dispersion guiding plate 47b of the middle cool air guiding portion and a dispersion guiding plate 47c of the lower cool air guiding portion are arranged at 90° and 45° with respect to a dispersion guiding plate 47a of the upper cool air guiding portion. Since dispersion guiding plates 47a, 47b and 47c of the upper, middle and lower cool air guiding portions are arranged at different angles, cool air collides with dispersion guiding plates 47a, 47b and 47c in different positions and directions, thus distributing the load. For example, if all the dispersion guiding plates are placed at the same angle, the cool air collides sharply with the dispersion guiding plates, depending on the rotative position of cool air discharge adjustment blade 26. Thus, much load is applied to the cool air discharge adjustment blade 26. However, according to the embodiment of the present invention, since the dispersion guiding plates of the upper, middle and lower cool air guiding portions are arranged at different angles, cool air discharge adjustment blade 26 is not overloaded, as described above.

As described above, side portions (concave portion 50 or convex portion 51) of all dispersion guiding plates 47a, 47b and 47c are placed at an angle of 90° or below, regardless of the rotative position of cool air discharge adjusting blade 26. Thus, a left-concentrated refrigeration, a center-concentrated refrigeration and a right-concentrated refrigeration can be performed by controlling the rotative angle of cool air discharge adjusting blade 26. FIGS. 12A–12C illustrate the left-, center- and right-concentrated refrigeration, respectively. Here, however, such concentrated refrigeration can be performed in any specified direction through the use of a control circuit.

To determine an area requiring concentrated refrigeration, as shown in FIG. 5, first temperature sensors 52a, 52b and 52c are installed at the center of the right side wall of each part in refrigeration compartment 3 and second temperature sensors 53a, 53b and 53c are installed at the center of the left side wall of each part in refrigeration compartment 3. These temperature sensors and the above-described position sensing switch 32 are connected to a controlling portion 54, i.e., a microprocessor. Driving motor 28 for driving cool air discharge adjustment blade 26 is also connected to control portion 54. The temperature sensors and position sensing switch 32 function to effectively perform the concentrated refrigeration by sensing temperature difference in refrigeration compartment 3.

The structures and operations of position sensing switch 32 for determining a reference position of cool air discharge adjustment blade 26 when performing concentrated refrigeration and an operating protrusion 33 for operating position sensing switch 32 are shown in FIGS. 14A–14C. Here, operating protrusion 33 rotates simultaneously with cool air discharge adjustment blade 26 in the direction of the arrows. FIG. 14C shows a relationship between position sensing switch 32 and operating protrusion 33 when they lose contact. In the embodiment, the position of cool air discharge adjustment blade 26 in the position of the above contact-lost moment is set as a reference position thereof. Also, a portion of operating protrusion 33, which contacts position sensing switch 32 is streamlined to prevent noise produced in a sudden separation of position sensing switch 32 from operating protrusion 33.

The operation and controlling method of the refrigerator constituted as above, according to the present invention, will be described as follows.

First, when compressor 11 and evaporator 12 start to operate, evaporator 12 produce cool air through a thermal exchange with the ambient air. The thus-produced cool air is supplied to freezer compartment 2 and refrigeration compartment 3 by cooling fan 13, as directed by the arrows of FIG. 4. The opening and closing of damper 19 are controlled in accordance with the temperature of refrigeration compartment 3. When damper 19 is opened, the cool air is supplied to refrigeration compartment 3 via guide path 18. The cool air which has passed through guide path 18 is dispersed to the left and right via first and second paths 35 and 36 and then discharged into auxiliary compartment 9.

The discharge of the cool air into refrigeration compartment 3 will be described in detail. The cool air flowing along first and second paths 35 and 36 is partially introduced into first and second linking paths 37 and 38 from the upper portion downward and then discharged through discharge holes 16. Here, the cool air is discharged, being distributed left and right by the rotation of cool air discharge adjustment blade 26. Without cool air discharging adjusting blade 26, the cool air can be distributed left and right since first and second discharge portions 39 and 40 of discharge hole 16 are vertically stepped with each other to be eccentric toward inlets of the cool air. However, the distribution of the cool air is accelerated by the rotation of cool air discharge adjustment blade 26, thus achieving uniform refrigeration for the refrigerator. In the embodiment, cool air discharge adjustment blade 26 rotates forward at a predetermined speed, that is, 6–10 rpm, by using a geared motor as a driving motor. This driving motor may be replaced with a stepping motor capable of varying the rotative speed.

In detail, as described above, discharge hole 16 is comprised of first and second discharge portions 39 and 40. First and second discharge portions 39 and 40 are communicated and vertically stepped with each other. The cool air introduced into either discharge portion is discharged in the opposite direction of the other, thus smoothly distributing the cool air in refrigeration compartment 3. Also, first and second discharge portions 39 and 40 exchange positions with those of the adjacent discharge hole. Thus, generally, the earlier the cool air is discharged, the higher its temperature is. However, if the cool air introduced from the right is lower in temperature than the cool air from the left in the upper discharge hole, the cool air introduced from the left is lower in temperature than the cool air from the right in the middle discharge hole. In the lower discharge hole, in turn, the cool air introduced from the right is lower in temperature than the cool air from the left. Then, uniform refrigeration can be realized across the refrigerator.

In addition, since middle flanges 372 is extended more outward than upper flanges 371 and lower flanges 373 than middle flanges 372, cooler air is discharged into refrigeration compartment 3 through lower first and second linking paths 37 and 38, and lower discharge hole. Thus, even though cool air discharged earlier and flowing down is generally higher in temperature, temperature difference depending on the height of the refrigeration compartment is eliminated, thereby achieving uniform refrigeration in the refrigeration compartment.

As described above, the refrigeration compartment can be uniformly refrigerated by discharging the cool air to be distributed and controlling the amount of the discharged cool air without cool air discharge adjustment blade 26. Further, the distribution of the cool air can be accelerated by the rotation of cool air discharge adjustment blade 26. Thus, uniform refrigeration is ensured in the refrigerator.

On the other hand, even if uniform refrigeration is achieved, when much foodstuff is stored or warm foodstuff is put in a particular area, the uniform refrigeration of the refrigeration compartment is no longer maintained. Also, the rotation of cool air discharge blade 26 is not effective in realizing uniform refrigeration. To solve this problem, concentrated refrigeration is needed for the particular area. The concentrated refrigeration according to the present invention will be described with reference to FIGS. 12A–12C. First, when the left side of the refrigeration compartment requires concentrated refrigeration, cool air discharge adjustment blade 26 is fixed to be directed so that the cool air is mainly discharged into the left side, as shown in FIG. 12A. Here, the dispersion guiding plates of the upper, middle and lower cool air guiding portions are arranged toward the left side in an angle of 0° to 90°. When the center of the refrigeration compartment requires concentrated refrigeration, cool air discharge adjustment blade 26 is fixed to be directed so that the cool air is mainly discharged into the center of the refrigeration compartment, as shown in FIG. 12B. Here, the dispersion guiding plates of the three cool air guiding portions are arranged toward the center in an angle of 0° to 90°. When the right side of the refrigeration compartment requires concentrated refrigeration, cool air discharge adjustment blade 26 is fixed to be directed so that the cool air is mainly discharged into the right of the refrigeration compartment, as shown in FIG. 12C. Here, the dispersion guiding plates of the three cool air guiding portions are arranged toward the center in an angle of 0° to 90°.

The control of the rotative angle of cool air discharge adjustment blade 26 is performed by position sensing switch 32 which is turned on and off by protrusion 33 of cool air discharge adjustment blade 26 and control portion 54. In this embodiment, from the point of time when operating protrusion 33 and position sensing switch 32 are separated, control portion 54 counts time and rotates cool air discharge adjustment blade 26 for a predetermined time to calculate the rotative angle thereof. For example, if the rotative angle of cool air discharge adjustment blade 26 is 6 rpm, a 10-second rotation from the reference point of time makes cool air discharge adjustment blade 26 rotate for one cycle.

By this control method, uniform refrigeration and intensive refrigeration which are characteristic of the present invention are performed. Referring to FIGS. 15 and 16, a method for controlling refrigerator temperature by controlling a cool air discharge direction will be described.

FIG. 15 is a flow-chart of the method for controlling refrigerator temperature by controlling a cool air discharge direction. As shown in the drawing, according to the temperature controlling method, difference in temperatures in refrigeration compartment 3 is reduced and refrigeration compartment 3 is kept at a predetermined temperature, at the same time, by measuring and comparing the temperatures of symmetrically opposing areas in the left and right sides, and intensively providing cool air toward an area of high temperature by using cool air discharge control blade 26 for controlling a cool air discharge direction, as shown in FIGS. 6 and 7A & 7B. That is, at least two temperature sensors are attached to the left and right side walls, respectively, the average values or representative values of temperatures sensed by the left temperature sensors are compared with the average values or representative values of temperatures sensed by the right temperature sensors, on the basis of temperature data of the left and right temperature sensors, and the cool air is intensively provided toward an area of high temperature according to the result of the comparison by using cool air discharge control blade 26.

To be more specific, as shown in FIG. 5, temperature sensors 53a, 53b and 53c are installed in the upper, middle, and lower parts of the left side, respectively, and temperature sensors 52a, 52b and 52c are installed in the upper, middle, and lower parts of the right side, respectively. The average value or representative value of temperatures $S_{L1}$, $S_{L2}$ and $S_{L3}$ sensed by 53a, 53b and 53c are compared with the average value or representative value of temperatures $S_{R1}$, $S_{R2}$ and $S_{R3}$ sensed by 52a, 52b and 52c. Then, cool air is discharged toward either of the left and right sides which is high in temperature.

The operation will be described in detail, as follows.

To compare average values (the average value of the temperatures $S_{L1}$, $S_{L2}$ and $S_{L3}$ is referred to as $S_{LM}$ and the average value of the temperatures $S_{R1}$, $S_{R2}$ and $S_{R3}$ is referred to as $S_{RM}$):

1. It is determined whether the compressor is initially on when power is applied. Then, the temperature in the refrigerator is considered as room temperature when the compressor is initially on, and cool air discharge control blade 26 is continuously rotated to prevent the increase of temperature differences among areas in the refrigerator during a rapid refrigeration;

2. Here, if the average value $S_{LM}$ of the temperatures sensed by the left temperature sensors is larger than the average value $S_{RM}$ of the temperatures sensed by the right temperature sensors, cool air discharge control blade 26 is directed toward the left side, to thereby reduce a relatively high temperature of the left side;

3. If $S_{RM}$ is larger than $S_{LM}$, cool air discharge control blade 26 is directed toward the right side, to thereby reduce a relatively high temperature of the right side;

4. If $S_{RM}$ is equal to $S_{LM}$, cool air discharge control blade 26 is directed toward the front, to thereby reduce a temperature difference between the left and right sides; and 5. If the door is open, cool air discharge control blade 26 is rotated to prevent loss of cool air.

By the above operation, a refrigeration is performed so that temperature difference between the left and right sides caused by the temperature of foodstuff stored in the refrigeration compartment or unbalanced storage of foodstuff is effectively reduced.

To compare the representative values of the temperature sensors, either of the two may be applied to the above-described average value comparison method to obtain a desired result:

1. The maximum value of the temperatures sensed by the left temperature sensors is compared with the maximum value of the temperatures sensed by the right temperature sensors, or 2. The medium value of the temperatures sensed by the left temperature sensors is compared with the medium value of the temperatures sensed by the right temperature sensors.

FIG. 16 is a flow-chart of a method for controlling refrigerator temperature by controlling a cool air discharge direction, according to another embodiment of the present invention.

Referring to FIG. 16, in the method for controlling refrigerator temperature by controlling a cool air discharge direction, difference in temperatures in refrigeration compartment 3 is reduced and refrigeration compartment 3 is kept at a predetermined temperature, by measuring difference between the temperatures of areas in the refrigerator, and rotating cool air discharge control blade 26 for controlling cool air discharge blade 26 as shown in FIGS. 6 and 7A & 7B or intensively providing cool air in a predetermined direction (toward an area of high temperature), on the basis of the absolute value of the temperature difference.

That is, at least two temperature sensors are attached in the refrigerator, and difference between temperatures is calculated from the temperature information of the temperature sensors. Then, depending on whether the absolute value of the temperature difference is larger or smaller than a predetermined value, it is determined the cool air is discharged in a predetermined direction, or the cool air is provided by rotating cool air discharge control blade.

To be more specific, temperature sensors S1 and S2 are installed on ¾ H of the right side wall and ⅓ H of the left side wall, respectively, and their respective temperatures are measured.

The absolute value |S1–S2| of difference between the temperatures is compared with a predetermined control reference temperature value.

That is, when cool air is discharged, if |S1–S2| is larger than a control reference temperature value $\Delta T1$, cool air is discharged to be uniformly distributed by rotating cool air discharge control blade 26. If |S1–S2| is smaller than a control reference temperature value $\Delta T1$, the cool air is intensively provided to an area of high temperature in the refrigeration compartment by fixing cool air discharge control blade 26 in a predetermined direction.

On the other hand, when cool air is not discharged, if |S1–S2| is larger than a control reference temperature value $\Delta T2$, the cool air is oscillated to be uniformly distributed in the refrigeration compartment by rotating cool air discharge control blade 26. If |S1–S2| is smaller than $\Delta T2$, cool air discharge control blade 26 is fixed.

The above method for controlling refrigerator temperature will be described in more detail.

When power is supplied and the compressor is initially on, the current temperature in the refrigeration compartment is considered to be equal to room temperature. In this case, cool air is uniformly scattered to prevent temperature difference increase among areas in the refrigerator (refrigeration compartment) during a rapid refrigeration, by continuously rotating a cool air discharge direction controlling device (a cool air discharge control blade). That is, when |S1–S2| is larger than $\Delta T1$, the cool air is provided to prevent the temperature increase of a particular area in the refrigeration compartment by uniformly scattering the cool air.

When the compressor is on and the damper is open, thus discharging cool air, cool air is discharged in a predetermined direction to be provided first to either of the left and right sides which is higher in temperature than the other.

Here, since |S1–S2| is smaller than ΔT1 and the temperature of the whole refrigeration compartment is almost equal to a predetermined refrigeration temperature, cool air is provided intensively to an area of high temperature by fixing cool air discharge control blade 26 in a predetermined direction, thereby achieving a uniform temperature distribution in the refrigeration compartment. An optimum ΔT1 is 3° C., practically.

When damper 19 is closed or the compressor is off, thus not discharging cool air, if difference in temperatures of the left and right sides in the refrigeration compartment is large, cool air is oscillated to be uniformly scattered by rotating cool air discharge control blade 26 until the temperature difference is reduced. That is, when cool air is not discharged, if |S1–S2| is larger than ΔT2, cool air is oscillated to be uniformly scattered by rotating cool air discharge control blade 26. If |S1–S2| is smaller than ΔT2, the cool air discharge control blade is fixed. An optimum ΔT2 is 1° C., practically.

As described above, the refrigerator and the method for controlling refrigerator temperature by controlling a cool air discharge direction, according to the present invention, have the following advantages.

In the refrigerator of the present invention, (1) uniform refrigeration can be performed in any case since the cool air paths distribute cool air according to the arrangement and configuration of the discharge holes and the cool air discharge control blade distributes the discharged cool air; (2) decrease in the effective area of the refrigerator is prevented since the cool air paths are formed at both sides of the discharge holes, the cool air discharge control blade is placed in the discharge holes, and thus the housing is made slim; (3) an assembly work is facilitated by forming the housing as an assembly body of a motor, a light, and the cool air discharge control blade which are combined; (4) molds are easy to fabricate and maintenance and repair work is convenient since the cooling discharge control blade is divided into two parts; (5) motor malfunction caused by introduction of moisture is prevented by disposing the motor above the cool air discharge control blade and installing the light near the motor; and (6) even if the cool air discharge control blade rotates at a low speed, cool air is discharged into the refrigerator, not flowing down, by placing disk-shaped cool air guiding portions in the discharge holes.

According to the method for controlling refrigerator temperature by controlling a cool air discharge direction, the average values or representative values of the temperatures sensed by temperature sensors installed in the left and right sides in the refrigeration compartment are compared, and cool air is discharged to an area of high temperature, thereby achieving uniform temperature distribution in the refrigeration compartment. Alternatively, temperature sensors are installed at ¾ H on the left wall and at ⅓ H on the right wall, respectively. When cool air is discharged, if a difference between temperatures sensed by the temperature sensors is larger than a control reference temperature 3° C., the cool air is uniformly scattered by rotating a cool air discharge control blade. If the temperature difference is 3° C. or smaller, the cool air is consistently provided to an area of relatively high temperature, thereby achieving uniform temperature distribution. When the cool air is not discharged, if the temperature difference is larger than another control reference temperature 1° C., the cool air is oscillated by rotating the cool air discharge control blade, and if the temperature difference is 1° C. or smaller, the cool air discharge control blade is fixed. Thus, a rapid refrigeration and a consistent and uniform temperature distribution are achieved in the refrigerator, regardless of the operational states of the compressor and the damper.

What is claimed is:

1. A refrigerator comprising:

a body having a freezer compartment and a refrigeration compartment;

an evaporator for producing cool air and providing said cool air to said freezer and refrigeration compartments;

a housing installed in a predetermined position of said refrigeration compartment and having a guide path for guiding said cool air from said evaporator into said refrigerator and a cool air path for guiding said cool air downward from said guide path; and a plurality of discharge holes vertically formed to correspond to respective sections of said refrigeration compartment in the center of said housing, for guiding said cool air which flows through said cool air path to be dispersedly discharged into said refrigeration compartment;

wherein said cool air path is provided with a first path and a second path at both sides of said discharge holes, first linking paths for linking respective discharge holes to said first path and second linking paths for linking respective discharge holes to said second path, and each of said discharge holes is provided with a first discharge portion directly linked to said first linking path and a second discharge position directly linked to said second linking path, said first discharge portion is communicated with said second discharge portion, and said first and second discharge portions are formed to be mutually stepped and eccentric toward said first linking path and said second linking path, respectively.

2. A refrigerator as claimed in claim 1, wherein the upper parts of said first and second linking paths are made round, and the lower parts thereof are extended more outward than said upper parts by a plurality of protrusions provided thereon.

3. A refrigerator as claimed in claim 2, wherein as said protrusions are positioned in lower places, said protrusion are extended more outward.

4. A refrigerator comprising:

a body having a freezer compartment and a refrigeration compartment;

an evaporator for producing cool air and providing said cool air to said freezer and refrigeration compartments;

a housing installed in a predetermined portion of said refrigeration compartment and having a guide path for guiding said cool air from said evaporator into said refrigerator and a cool air path for guiding said cool air downward from said guide path;

a plurality of discharge holes vertically formed in said housing, for guiding said cool air which flows through said cool air path to be discharged into said refrigeration compartment;

a cool air discharge adjustment blade rotatably installed in said housing, for controlling a direction in which said cool air is discharged from said discharge holes; and a driving motor for rotating said cool air discharge adjustment blade.

5. A refrigerator as claimed in claim 4, wherein said cool air discharge adjustment blade is provided with a distribution plate including an upper plate, a lower plate and a middle plate which are vertically spaced by predetermined distances, and a dispersion guiding blade including a first dispersion guiding blade for vertically connecting said upper and middle plates and a second dispersion guiding blade for connecting said middle and lower plates.

6. A refrigerator as claimed in claim 5, wherein said first and second guiding blades are composed of respective convex portions and concave portions which are rounded and connected to each other.

7. A refrigerator as claimed in claim 6, wherein said concave portions and said convex portions of said first dispersion guiding blades, and said concave portions and said convex portions of said second dispersion guiding blades are disposed in mutually opposite positions, respectively.

8. A refrigerator as claimed in claim 5, wherein said cool air discharge adjustment blade is provided with a cool air guiding portion including said distribution plate and said dispersion guiding blade, said cool air guiding portion is provided with an upper cool air guiding portion, a middle cool air guiding portion, and a lower cool air guiding portion corresponding to said upper, middle, and lower parts of said refrigeration compartment, respectively, said cool air guiding portions being integrally connected by a supporting shaft.

9. A refrigerator as claimed in claim 8, wherein the angle between said dispersion guiding blades of said upper cool air guiding portion and said middle cool air guiding portion is 90°, and the angle between said dispersion guiding blades of said upper cool air guiding portion and said lower cool air guiding portion is 45°.

10. A refrigerator as claimed in claim 9, wherein assuming that the height of said refrigeration compartment is H, said upper cool air guiding portion is placed at ¾ H, said middle cool air guiding portion at ½ H, and said lower cool air guiding portion at ⅓ H.

11. A refrigerator as claimed in claim 9, wherein said cool air discharge adjustment blade can be divided into an upper and a lower cool air discharge adjustment blade, and said upper and middle cool air guiding portions are arranged in said upper cool air discharge adjustment blade and said lower cool air guiding portion is placed in the lower side of said lower cool air discharge adjustment blade.

12. A refrigerator as claimed in claim 4, wherein said refrigerator further comprises first temperature sensors installed in the center of one side wall of each part in said refrigeration compartment, second temperature sensors installed in the center of the other side wall thereof, a position sensing switch for turning on/off in accordance with the rotative position of said cool air discharge adjustment blade, and a control portion electrically connected to said first temperature sensor, said second temperature sensor and said position sensing switch, for determining the rotative position of said cool air discharge adjustment blade.

13. A refrigerator as claimed in claim 12 wherein said position sensing switch is installed in said housing above said cool air discharge adjustment blade, and an operation protrusion is provided in the upper side of said cool air discharge adjustment blade, for turning on and off said position sensing switch by rotating with said cool air discharge adjustment blade.

14. A refrigerator as claimed in claim 13, wherein a portion of said operation protrusion which contacts with said position sensing switch is rounded.

15. A refrigerator as claimed in claim 4, wherein said driving motor is installed in said housing above said cool air discharge adjustment blade, being accommodated in a motor case, and a light is installed adjacent to said driving motor in said housing.

16. A refrigerator as claimed in claim 15, wherein a light is installed adjacent to said driving motor.

17. A refrigerator comprising:
a body having a freezer compartment and a refrigeration compartment;
an evaporator for producing cool air and providing said cool air to said freezer and refrigeration compartments;
a housing installed in a predetermined portion of said refrigeration compartment and having a guide path for guiding said cool air from said evaporator to said refrigeration compartment;
cool air paths formed at both sides of said housing to be communicated with said guide path and having a first path and a second path to guide said cool air from said guide path;
a plurality of discharge holes vertically arranged between said first path and said second path, for guiding said cool air to be discharged into said refrigeration compartment through said cool air paths;
a cool air discharge adjustment blade rotatably installed in the front surface, for distributing left and right or collecting said cool air from said discharge holes; and
a driving motor for rotating said cool air discharge adjustment blade.

18. A refrigerator as claimed in claim 17, wherein said cool air path is further provided with first linking paths for linking respective discharge holes to said first path and second linking paths for linking respective discharge holes to said second path, each discharge hole is provided with a first discharge portion directly linked to said first linking path and a second discharge portion directly linked to said second linking path, said first discharge portion is communicated with said second discharge portion, and said first and second discharge portions are formed to be mutually stepped and eccentric toward said first linking path and said second linking path, respectively.

19. A refrigerator as claimed in claim 18, wherein the inlets and upper parts of said first and second linking paths are made round, and the lower parts thereof are extended more outward than said upper parts by a plurality of protrusions provided thereon.

20. A refrigerator as claimed in claim 19, wherein as said protrusions are positioned in lower places, said protrusions are extended more outward.

21. A refrigerator as claimed in claim 18, wherein said cool air discharge adjustment blade is provided with a distribution plate having a middle plate placed at the boundary surface between said first discharge portion and second discharge portion, and an upper plate and a lower plate which are placed over and under said middle plate by the height of said middle plate, respectively, and a dispersion guiding blade having a first dispersion guiding blade for vertically connecting said upper plate and said middle plate, and a second dispersion guiding blade for vertically connecting said middle plate and said lower plate.

22. A refrigerator as claimed in claim 21, wherein said first and second guiding blades are composed of respective convex portions and concave portions which are rounded.

23. A refrigerator as claimed in claim 22, wherein said concave portions of said first and second dispersion guiding blades and/or said convex portions of said first and second dispersion guiding blades are disposed in mutually opposite positions.

24. A refrigerator as claimed in claim 21, wherein said distribution plate is provided with an upper cool air guiding portion, a middle cool air guiding portion, and a lower cool air guiding portion corresponding to the upper, middle, and lower parts of said refrigeration compartment, respectively, and said distribution plates are integrally connected by a supporting shaft.

25. A refrigerator as claimed in claim 24, wherein the angle between the dispersion guiding blades of said upper cool air guiding portion and said middle cool air guiding portion is 90°, and the angle between the dispersion guiding blades of said upper cool air guiding portion and said lower cool air guiding portion is 45°.

26. A refrigerator as claimed in claim 25, wherein assuming that the height of said refrigeration compartment is H, said upper cool air guiding portion is placed at ¾ H, said middle cool air guiding portion at ½ H, and said lower cool air guiding portion at ⅓ H.

27. A refrigerator as claimed in claim 17, wherein said refrigerator further comprises first temperature sensors installed in the center of one side wall of each part in said refrigeration compartment, second temperature sensors installed in the center of the other side wall thereof, a position sensing switch for turning on/off in accordance with the rotative position of said cool air discharge adjustment blade, and a control portion electrically connected to said first temperature sensor, said second temperature sensor and said position sensing switch, for determining the rotative position of said cool air discharge adjustment blade.

28. A refrigerator as claimed in claim 27, wherein said position sensing switch is installed in said housing above said cool air discharge adjustment blade, and an operation protrusion is provided in the upper end of said cool air discharge adjustment blade, for turning on/off said position sensing switch by rotating with said cool air discharge adjustment blade.

29. A refrigerator as claimed in claim 28, wherein a portion of said operation protrusion which contacts with said position sensing switch is rounded.

30. A refrigerator as claimed in claim 17, wherein a motor case is installed in said housing above said cool air discharge adjustment blade, for accommodating a driving motor, and a light is installed adjacent to said motor case in said housing.

31. A refrigerator as claimed in claim 17, wherein a concave groove is formed into the rear surface of said refrigeration compartment, for installing said housing, and the front surface of said housing is level with the rear surface thereof.

32. A refrigerator as claimed in claim 31, wherein a seal plate is provided between the rear surface of said housing and said concave groove.

33. A refrigerator as claimed in claim 17, wherein a latticed grill is installed onto the front surface of said housing to cover said cool air discharge adjustment blade.

34. A refrigerator comprising:
- a housing installed on the rear wall of a refrigeration compartment;
- a cool air path installed in a predetermined position of said housing, for guiding cool air;
- a plurality of discharge holes communicated with said cool air path;
- a cool air discharge adjustment blade rotatably installed in each discharge hole; and
- a driving motor accommodated in a motor case, installed in said housing above said cool air discharge adjustment blade, for driving said cool air discharge adjustment blade.

35. A refrigerator as claimed in claim 34, wherein a position sensing switch is provided below said driving motor to be interlocked with an operation protrusion disposed above said cool air discharge adjustment blade.

36. A refrigerator as claimed in claim 34, wherein a light is installed adjacent to said driving motor.

37. A refrigerator comprising:
- a housing installed on the rear wall of a refrigeration compartment;
- a cool air path formed in a predetermined portion of said housing, for guiding cool air;
- a plurality of discharge holes communicated with said cool air path;
- at least one plate member rotatably placed in each discharge hole, for horizontally guiding said cool air discharged from said discharge holes; and
- a dispersion guiding blade vertically provided on said plate member, for dispersing said cool air.

38. A refrigerator as claimed in claim 37, wherein said cool air path is divided into a first path and a second path parallel to each other.

39. A refrigerator having a cool air dispersion device installed on the rear wall of a refrigeration compartment, for keeping a uniform temperature distribution in said refrigeration compartment, the refrigerator comprising:
- a housing;
- a guide path installed at one side of said housing, for guiding cool air;
- a first path and a second path divided from said guide path, in parallel with each other, and provided in said housing;
- a plurality of discharge holes installed between said first path and said second path, respectively communicating with said first path and said second path;
- a cool air discharge adjustment blade rotatably placed in each discharge hole;
- a grill facing said cool air discharge adjustment blade, for protecting said cool air discharge adjustment blade in order to rotatingly discharge cool air into said refrigeration compartment from said first and second paths when said cool air discharge adjustment blade rotates.

40. A method for controlling refrigerator temperature by controlling a cool air discharge direction, comprising the steps of:
- determining whether a refrigerant circulating compressor is initially turned on, when power is applied;
- determining whether a door of a refrigerator is open, when said compressor is not initially on;
- firstly discharging cool air to be distributed by rotating a discharge damper with damper control means for controlling the amount of the cool air discharged into a refrigerator, when said compressor is initially on;
- secondly discharging cool air to be distributed by rotating said discharge damper with said damper control means for controlling the amount of the cool air discharged into said refrigerator, when said door is open;
- determining whether the average value of temperatures sensed by first temperature sensing means provided at a first position of said refrigerator is larger than the average value of temperatures sensed by second temperature sensing means provided at a second position of said refrigerator to face the first temperature sensing means, when said door is not open;
- discharging the cool air toward said first temperature sensing means under control of said cool air discharge direction controlling means, if the average value of temperatures sensed by said first temperature sensing means is larger than the average value of temperatures sensed by said second temperature sensing means;

determining whether the average value of temperatures sensed by said first temperature sensing means is smaller than the average value of temperatures sensed by said second temperature sensing means, if the average value of temperatures sensed by said first temperature sensing means is not larger than the average value of temperatures sensed by said second temperature sensing means;

discharging the cool air toward said second temperature sensing means under control of said cool air discharge direction controlling means, if the average value of temperatures sensed by said first temperature sensing means is smaller than the average value of temperatures sensed by said second temperature sensing means; and discharging the cool air toward the front under control of said cool air discharge direction controlling means, if the average value of temperatures sensed by said first temperature sensing means is equal to the average value of temperatures sensed by said second temperature sensing means.

41. A method for controlling refrigerator temperature by controlling a cool air discharge direction as claimed in claim 40, wherein said average value can be replaced with a representative value.

42. A method for controlling refrigerator temperature by controlling a cool air discharge direction as claimed in claim 40, wherein said steps of comparing the average value of temperatures sensed by said first temperature sensing means with the average value of temperatures sensed by said second temperature sensing means further comprise the step of calculating the average values of the temperatures sensed by said first and second temperature sensing means, respectively.

43. A method for controlling refrigerator temperature by controlling a cool air discharge direction as claimed in claim 41, wherein said steps of comparing the representative value of temperatures sensed by said first temperature sensing means with the representative value of temperatures sensed by said second temperature sensing means further comprise the step of comparing the temperatures sensed by the first temperature sensing means with one another and comparing the temperatures sensed by the second temperature sensing means with one another, in order to obtain respective representative values of the temperatures sensed by said first and second temperature sensing means.

44. A method for controlling refrigerator temperature by controlling a cool air discharge direction as claimed in claim 43, wherein in said step of comparing said representative values, the maximum values of the temperatures sensed by said first and second temperature sensing means are compared.

45. A method for controlling refrigerator temperature by controlling a cool air discharge direction as claimed in claim 42, wherein in said step of comparing said representative values, the medium values of the temperatures sensed by said first and second temperature sensing means are compared.

46. A method for controlling refrigerator temperature by controlling a cool air discharge direction, comprising the steps of:

determining whether a refrigerant circulating compressor is initially on, when power is applied;

determining whether said compressor is on in a normal operation, when said compressor is not initially on;

determining whether a damper for controlling the amount of cool air discharged into a refrigerator is open, when said compressor is on in the normal operation;

determining whether a control reference temperature for discharge of cool air is larger than the absolute value of a difference in temperatures sensed by two temperature sensing means which are selected from at least two temperature sensing means arranged to face each other a predetermined distance apart, when said damper is open;

determining whether a control reference temperature for non-discharge of cool air is larger than the absolute value of a difference in temperatures sensed by said two temperature sensing means, when said compressor is not on in the normal operation;

determining whether the control reference temperature for non-discharge of cool air is larger than the absolute value of a difference in temperatures sensed by said two temperature sensing means, when said damper is open;

firstly discharging the cool air in a predetermined direction, when said control reference temperature for discharge of cool air is larger than the absolute value of a difference in temperatures sensed by said two temperature sensing means;

secondly discharging the cool air in the predetermined direction, when said control reference temperature for non-discharge of cool air is larger than the absolute value of a difference in temperatures sensed by said two temperature sensing means;

firstly rotating a cool air discharge control blade, when said compressor is initially on;

secondly rotating a cool air discharge control blade, when said control reference temperature for discharge of cool air is not larger than the absolute value of a difference in temperatures sensed by said two temperature sensing means; and thirdly rotating a cool air discharge control blade, when said control reference temperature for non-discharge of cool air is not larger than the absolute value of a difference in temperatures sensed by said two temperature sensing means.

47. A method for controlling refrigerator temperature by controlling a cool air discharge direction as claimed in claim 46, wherein said control reference temperature for discharge of cool air is always larger than said control reference temperature for non-discharge of cool air.

48. A method for controlling refrigerator temperature by controlling a cool air discharge direction as claimed in claim 45, wherein said control reference temperature for discharge of cool air is 3° C.

49. A method for controlling refrigerator temperature by controlling a cool air discharge direction as claimed in claim 45, wherein said control reference temperature for non-discharge of cool air is 1° C.

* * * * *